(12) United States Patent
Suto

(10) Patent No.: US 11,385,053 B2
(45) Date of Patent: Jul. 12, 2022

(54) DISTANCE MEASURING CAMERA

(71) Applicant: MITSUMI ELECTRIC CO., LTD., Tama (JP)

(72) Inventor: Satoru Suto, Tama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/269,521

(22) PCT Filed: Oct. 7, 2019

(86) PCT No.: PCT/JP2019/039471
§ 371 (c)(1),
(2) Date: Feb. 18, 2021

(87) PCT Pub. No.: WO2020/090358
PCT Pub. Date: May 7, 2020

(65) Prior Publication Data
US 2021/0262793 A1    Aug. 26, 2021

(30) Foreign Application Priority Data

Nov. 1, 2018 (JP) .............................. JP2018-206290

(51) Int. Cl.
*G01C 3/02* (2006.01)
*G06T 7/73* (2017.01)
(Continued)

(52) U.S. Cl.
CPC ............... *G01C 3/02* (2013.01); *G06T 7/593* (2017.01); *G06T 7/60* (2013.01); *G06T 7/73* (2017.01);
(Continued)

(58) Field of Classification Search
CPC . G01C 3/02; G01C 3/06; G01C 11/04; G06K 9/46; G06K 9/6203; G06T 7/593;
(Continued)

(56) References Cited

U.S. PATENT DOCUMENTS

2009/0214107 A1* 8/2009 Masuda .................. G06T 7/593
382/154
2021/0279903 A1* 9/2021 Suto ......................... G01C 3/08

FOREIGN PATENT DOCUMENTS

JP       H09231373 A       9/1997
JP       2001-141422   *   5/2001  ............. G01B 11/24
(Continued)

OTHER PUBLICATIONS

ISA Japan Patent Office, International Search Report Issued in Application No. PCT/JP2019/039471, dated Dec. 3, 2019, WIPO, 1 page.

*Primary Examiner* — Farzana Hossain
(74) *Attorney, Agent, or Firm* — McCoy Russell LLP

(57) ABSTRACT

The distance measuring camera includes a first imaging system for obtaining a first image, a second imaging system for obtaining a second image and a size obtaining part 3 for measuring a distance between a plurality of feature points of a first subject in the first image to obtain a size of the first subject image and measuring a distance between a plurality of feature points of a second subject image in the second image to obtain a size of the second subject image. The size obtaining part 3 searches pixels on an epipolar line only in a search area of the second image in which a first imaging area corresponding to the first image can be overlapped with a second imaging area corresponding to the second image to detect the plurality of feature points of the second subject image.

6 Claims, 14 Drawing Sheets

(51) Int. Cl.
   *G06T 7/593*   (2017.01)
   *H04N 13/239*  (2018.01)
   *G06T 7/60*    (2017.01)
   *H04N 5/247*   (2006.01)
   *G06V 10/40*   (2022.01)

(52) U.S. Cl.
   CPC ............. *G06V 10/40* (2022.01); *H04N 5/247* (2013.01); *H04N 13/239* (2018.05)

(58) Field of Classification Search
   CPC ........... G06T 7/60; G06T 7/73; H04N 13/239; H04N 5/247; H04N 13/139; H04N 13/271; H04N 2013/0081; G06V 10/40; G06V 10/7515
   See application file for complete search history.

(56) References Cited

FOREIGN PATENT DOCUMENTS

| | | |
|---|---|---|
| JP | 2012026841 A | 2/2012 |
| JP | 2012209895 A | 10/2012 |
| JP | 2019109124 A | 7/2019 |
| WO | 2011096251 A1 | 8/2011 |

\* cited by examiner

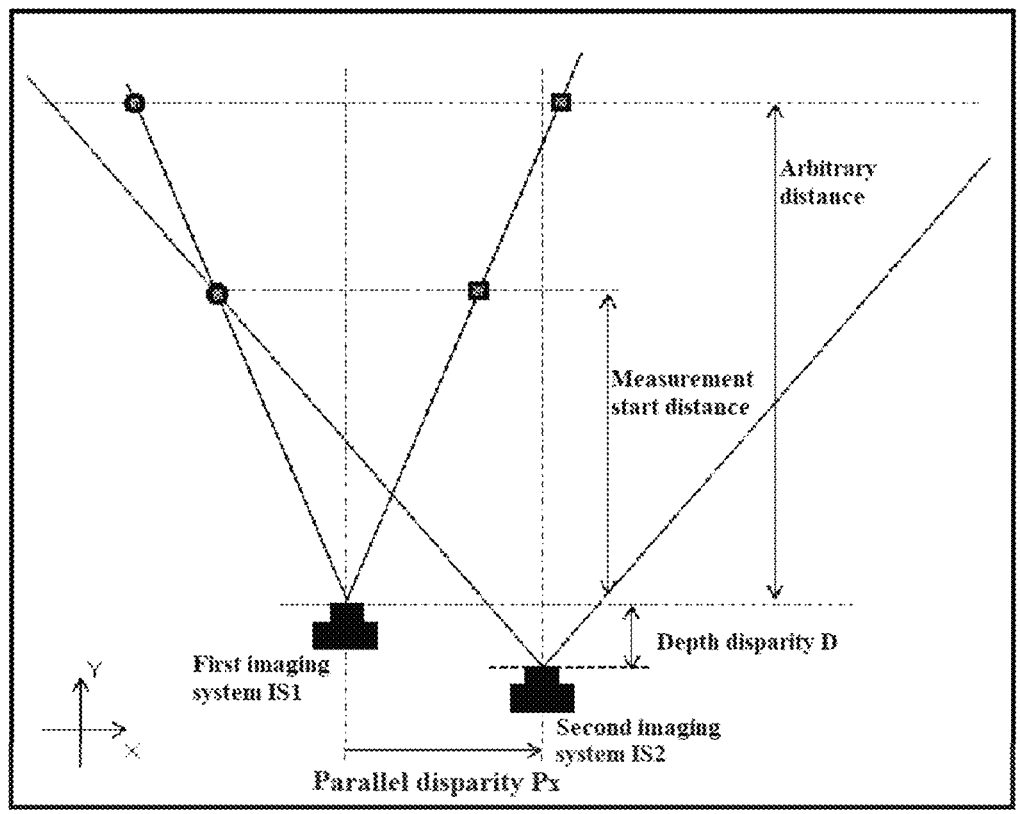
Case: parallel disparity Px > 0
Position of feature point in second image corresponding to feature point existing at left-side edge of first image
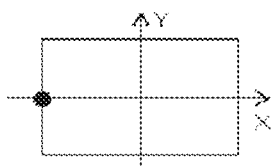
Fig. 3a
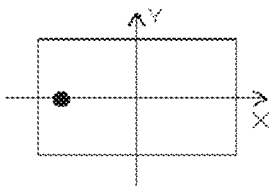
Fig. 3b
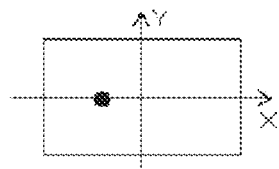
Fig. 3c
Position of feature point in second image corresponding to feature point existing at right-side edge of first image
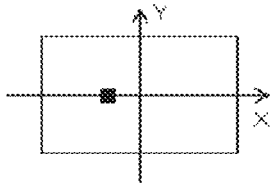
Fig. 3d
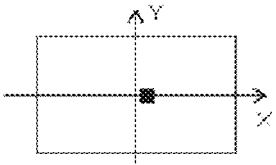
Fig. 3e
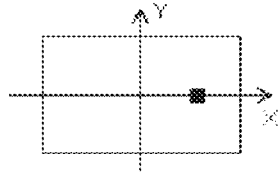
Fig. 3f

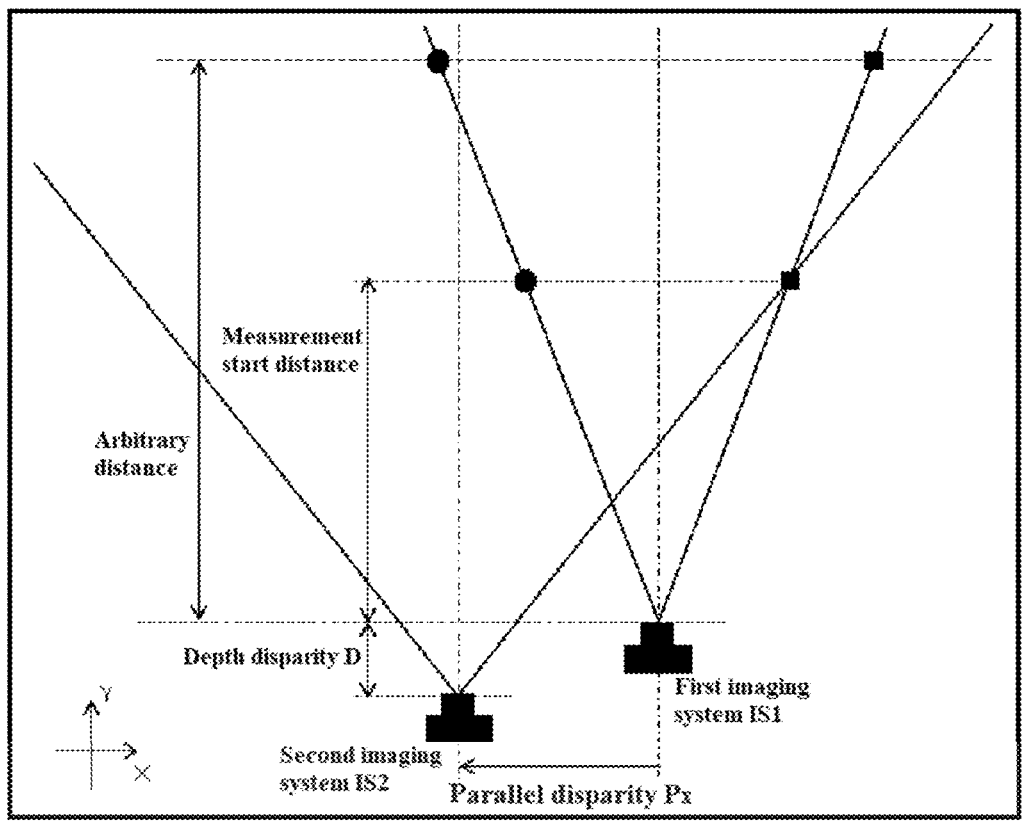
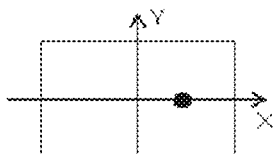
Fig. 5a
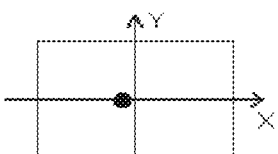
Fig. 5b
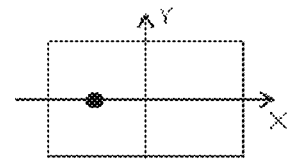
Fig. 5c
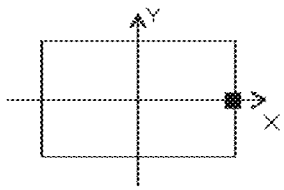
Fig. 5d
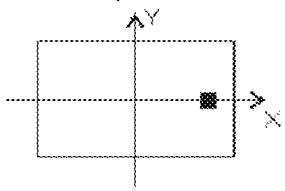
Fig. 5e
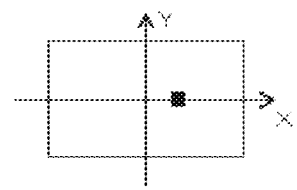
Fig. 5f

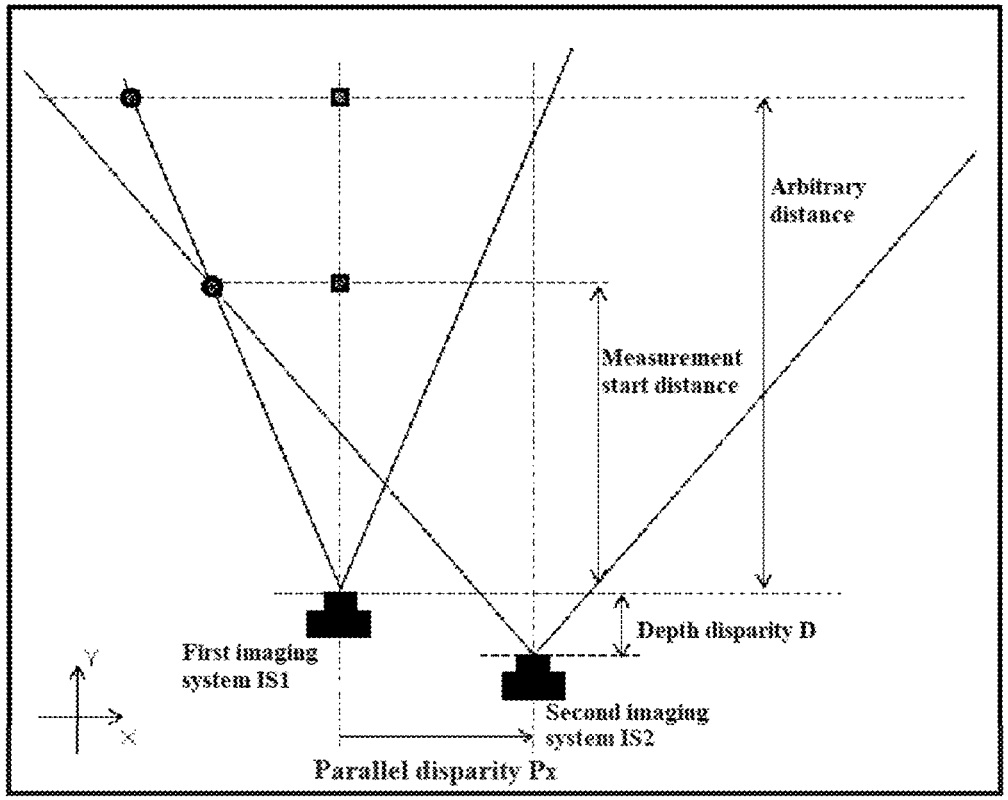
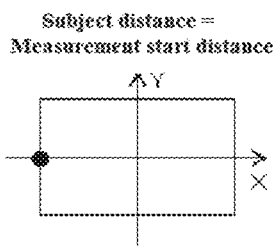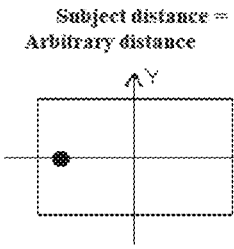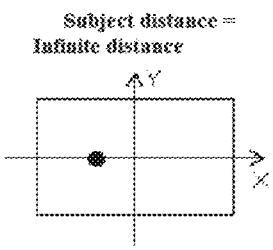
Fig. 9a   Fig. 9b   Fig. 9c
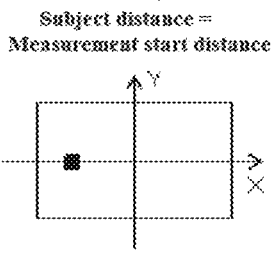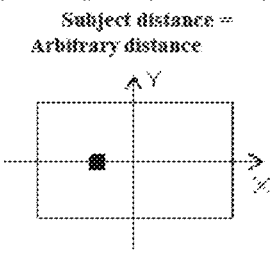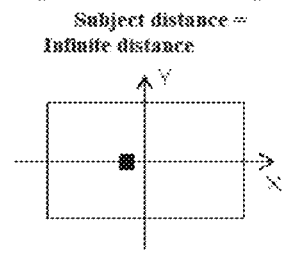
Fig. 9d   Fig. 9e   Fig. 9f

Case: parallel disparity Px > 0 and feature point in first image exists in right area
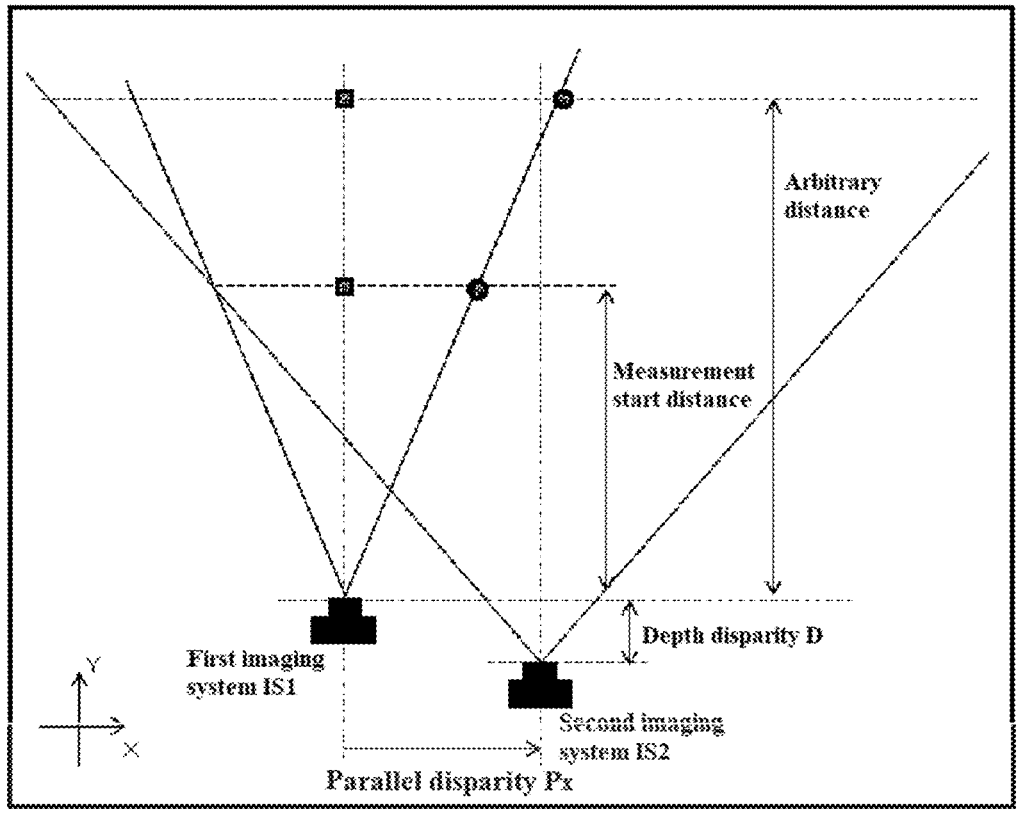
Position of feature point in second image corresponding to feature point existing at right-side edge of first image
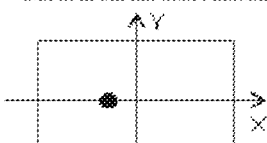
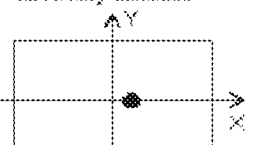
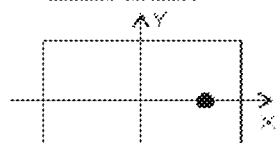
Fig. 11a  Fig. 11b  Fig. 11c
Position of feature point in second image corresponding to feature point existing at center of first image
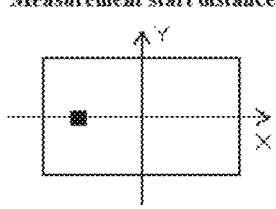
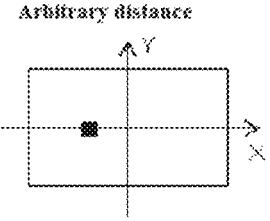
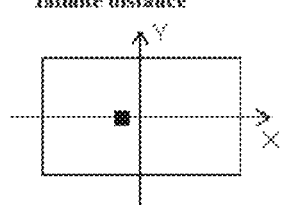
Fig. 11d  Fig. 11e  Fig. 11f

DISTANCE MEASURING CAMERA

CROSS REFERENCE TO RELATED APPLICATIONS

The present application is a U.S. National Phase of International Application No. PCT/JP2019/039471 entitled "RANGING CAMERA," and filed on Oct. 7, 2019. International Application No. PCT/JP2019/039471 claims priority to Japanese Patent Application No. 2018-206290 filed on Nov. 1, 2018. The entire contents of each of the above-listed applications are hereby incorporated by reference for all purposes.

TECHNICAL FIELD

The present invention generally relates to distance measuring cameras for measuring a distance to a subject, in particular to a distance measuring camera for measuring a distance to a subject based on an image magnification ratio between at least two subject images respectively formed by at least two optical systems whose changes of magnitudes of the subject images according to the distance to the subject are different from each other.

BACKGROUND AND SUMMARY

Conventionally, there has been proposed a distance measuring camera for measuring a distance to a subject by imaging the subject. As such a distance measuring camera, a stereo camera type distance measuring camera including two or more pairs of an optical system for collecting light from the subject to form a subject image and an image sensor for converting the subject image formed by the optical system to an image data (for example, see patent document 1).

The stereo camera type distance measuring camera disclosed by the patent document 1 can calculate a parallel disparity (disparity in a direction perpendicular to an optical axis direction) between two subject images respectively formed by two optical systems arranged so as to be shifted from each other in the direction perpendicular to the optical axis direction and calculate the distance to the subject based on a value of the parallel disparity.

The stereo camera type distance measuring camera as described above cannot accurately calculate the distance to the subject when the parallel disparity between the subject images is small. Thus, it is necessary to arrange the two optical systems so as to be largely spaced apart from each other in the direction perpendicular to the optical axis direction in order to sufficiently increase the parallel disparity between the subject images. This makes it difficult to reduce a size of the distance measuring camera.

Further, when the subject is located at a near distance from the distance measuring camera, there may be a situation that a feature point of the subject image for calculating the parallel disparity exists in one of two obtained image data and does not exist in the other one of the two obtained image data due to a relationship of visual fields of the two obtained image data. In order to avoid this situation, it is necessary to arrange the two optical systems so as to be close to each other. However, if the two optical systems are arranged so as to be close to each other, the parallel disparity between the subject images decreases and thus accuracy of the distance measurement reduces. Therefore, it is difficult to accurately calculate the distance to the subject located at the near distance from the distance measuring camera with the distance measurement based on the parallel disparity between the subject images.

To address this problem, an image magnification ratio type distance measuring camera for calculating a distance to a subject based on an image magnification ratio between two subject images (ratio between magnifications of two subject images) has been proposed by the inventor of the present invention and others. The image magnification ratio type distance measuring camera uses two optical systems configured so that changes of magnifications of subject images respectively formed by the two optical systems according to the distance to the subject are different from each other and calculates the distance to the subject based on the image magnification ratio between the two subject images (the ratio between the magnifications of the two subject images) respectively formed by the two optical systems (see patent document 2).

In this image magnification ratio type distance measuring camera, the parallel disparity between the subject images is not utilized for calculating the distance to the subject. Thus, even if the two optical systems are arranged so as to be close to each other, the image magnification ratio type distance measuring camera can accurately calculate the distance to the subject. Therefore, it is possible to reduce the size of the distance measuring camera. Further, since the image magnification ratio between the subject images can be accurately obtained even when the subject is located at the near distance from the distance measuring camera, the image magnification ratio type distance measuring camera can accurately calculate the distance to the subject located at the near distance.

The image magnification ratio between the subject images is calculated from a ratio between sizes of the two subject images. In order to obtain the sizes of the subject images, it is necessary to detect a plurality of feature points of the subject image (for example, both edge portions of the subject to be measured in a height direction or a width direction) in image data obtained by imaging the subject image and measure a distance between the feature points in the image data. Further, in order to obtain the image magnification ratio between the subject images, it is necessary to obtain sizes of same parts of the two subject images. Therefore, after detecting the plurality of feature points of one of the subject images, it is necessary to perform a corresponding feature point detection process for detecting a plurality of feature points of the other one of the subject images respectively corresponding to the plurality of detected feature points of the one of the subject images.

The corresponding feature point detection process as described above is generally performed by searching an entire area of the image data obtained by imaging the other one of the subject images. However, the search for the entire area of the image data requires a long processing time and thus a processing time for the corresponding feature point detection process becomes long. As a result, there is a problem that a processing time for calculating the distance to the subject based on the image magnification ratio between the subject images becomes long.

RELATED ART DOCUMENTS

Patent Documents

JP 2012-26841A 1
JP 2017-241896

Problem to be Solved by the Invention

The present invention has been made in view of the above-mentioned problem of the conventional art. Accordingly, it is an object of the present invention to provide a distance measuring camera which can reduce a processing time for calculating a distance to a subject based on an image magnification ratio between subject images.

Means for Solving the Problems

This object is achieved by the present inventions as defined in the following (1) to (6).
(1) A distance measuring camera, comprising:
    a first imaging system including a first optical system for collecting light from a subject to form a first subject image and a first image sensor for imaging the first subject image to obtain a first image containing the first subject image;
    a second imaging system including a second optical system for collecting the light from the subject to form a second subject image and arranged so as to be shifted from the first optical system in a direction perpendicular to an optical axis direction of the first optical system and a second image sensor for imaging the second subject image to obtain a second image containing the second subject image;
    a size obtaining part for detecting a plurality of feature points of the first subject image in the first image and measuring a distance between the plurality of feature points of the first subject image to obtain a size of the first subject image and detecting a plurality of feature points of the second subject image in the second image respectively corresponding to the plurality of feature points of the first subject image and measuring a distance between the plurality of feature points of the second subject image to obtain a size of the second subject image; and
    a distance calculating part for calculating a distance to the subject based on an image magnification ratio between a magnification of the first subject image and a magnification of the second subject image,
    wherein the image magnification ratio is obtained as a ratio between the size of the first subject image and the size of the second subject image obtained by the size obtaining part, and
    wherein the size obtaining part searches pixels on a plurality of epipolar lines respectively corresponding to the plurality of feature points of the first subject image only in a search area of the second image in which a first imaging area corresponding to the first image can be overlapped with a second imaging area corresponding to the second image to detect the plurality of feature points of the second subject image in the second image.
(2) The distance measuring camera according to the above (1), wherein the first imaging system and the second imaging system are configured so that an entire area of the first imaging area corresponding to the first image is contained within the second imaging area corresponding to the second image when the subject located at a distance which is equal to or larger than a measurement start distance determined by arrangements and characteristics of the first imaging system and the second imaging system is imaged.
(3) The distance measuring camera according to the above (2), wherein a focal length of the first optical system is longer than a focal length of the second optical system.
(4) The distance measuring camera according to the above (2) or (3), wherein the size obtaining part is configured to identify the search area of the second image in which the first imaging area corresponding to the first image can be overlapped with the second imaging area corresponding to the second image based on the arrangements and the characteristics of the first imaging system and the second imaging system.
(5) The distance measuring camera according to any one of the above (1) to (4), wherein the size obtaining part is configured to identify a position of each of the plurality of feature points of the first subject image in the first image and limit the search area of the second image based on the position of each of the plurality of feature points of the first subject image in the first image at the time of detecting the plurality of feature points of the second subject image in the second image respectively corresponding to the plurality of feature points of the first subject image.
(6) The distance measuring camera according to the above (5), wherein the size obtaining part is configured to identify whether each of the plurality of feature points of the first subject image is located in a left area from a center of the first image or in a right area from the center of the first image and limit the search area of the second image based on whether each of the plurality of feature points of the first subject image is located in the left area of the first image or in the right area of the first image at the time of detecting the plurality of feature points of the second subject image in the second image respectively corresponding to the plurality of feature points of the first subject image.

Effects of the Invention

The distance measuring camera of the present invention performs the search for the plurality of feature points with the epipolar line based on the epipolar geometry in a corresponding feature point detection process for detecting the plurality of feature points of the second subject image in the second image obtained by the second imaging system and respectively corresponding to the plurality of feature points of the first subject image in the first image obtained by the first imaging system. Therefore, it is possible to reduce a processing time for calculating the distance to the subject based on the image magnification ratio between the subject images.

Further, in the corresponding feature point detection process performed by the distance measuring camera of the present invention, the search for the pixels on the epipolar line is performed only in the search area in which the first imaging area corresponding to the first image can be overlapped with the second imaging area corresponding to the second image. Therefore, in the distance measuring camera of the present invention, the search area in the second image is limited as compared with the case where the search for the pixels on the epipolar line is performed over an entire area of the second image. With this process, it is possible to further reduce the processing time for calculating the distance to the subject based on the image magnification ratio between the subject images.

BRIEF DESCRIPTION OF THE FIGURES

FIGS. 3a-f are diagrams for explaining an example of arrangements of a first imaging system and a second imaging system of the distance measuring camera shown in FIG.

1 and changes of positions of feature points in the second image respectively corresponding to feature points in a first image according to a distance to a subject.

Figure 4:
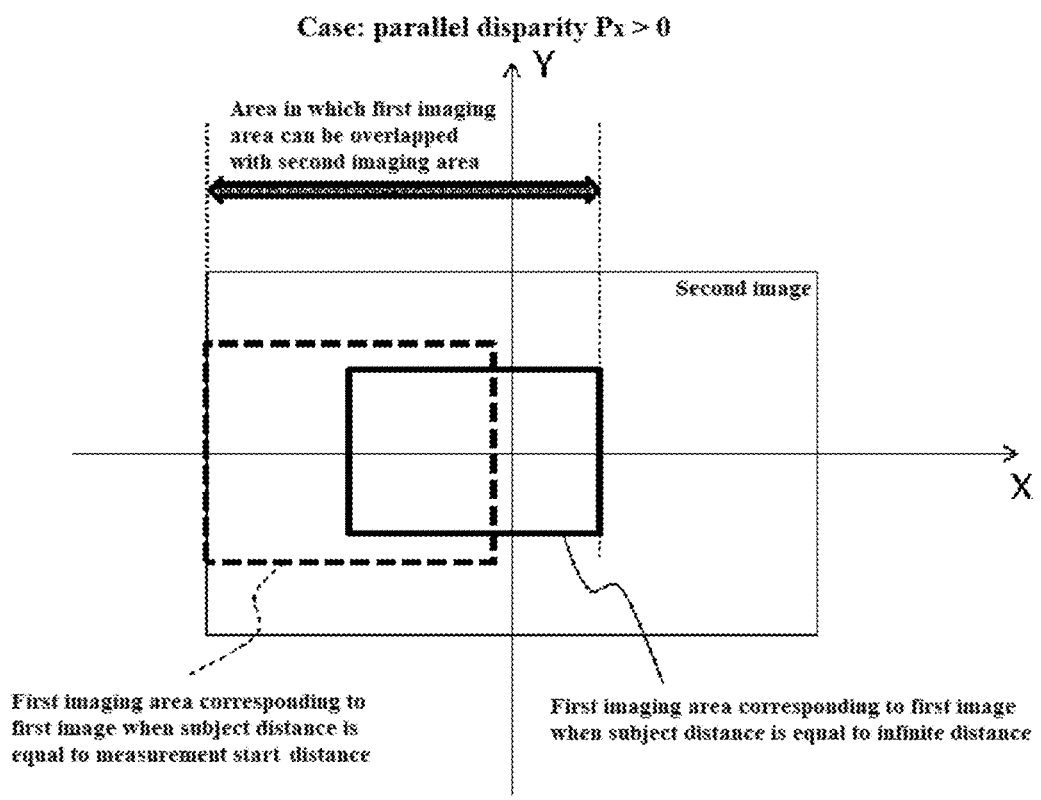

FIG. 4 is a diagram for explaining an area in which a first imaging area corresponding to the first image can be overlapped with a second imaging area corresponding to the second image in the example of the arrangements of the first imaging system and the second imaging system shown in FIGS. 3a-f.

Figure 1:
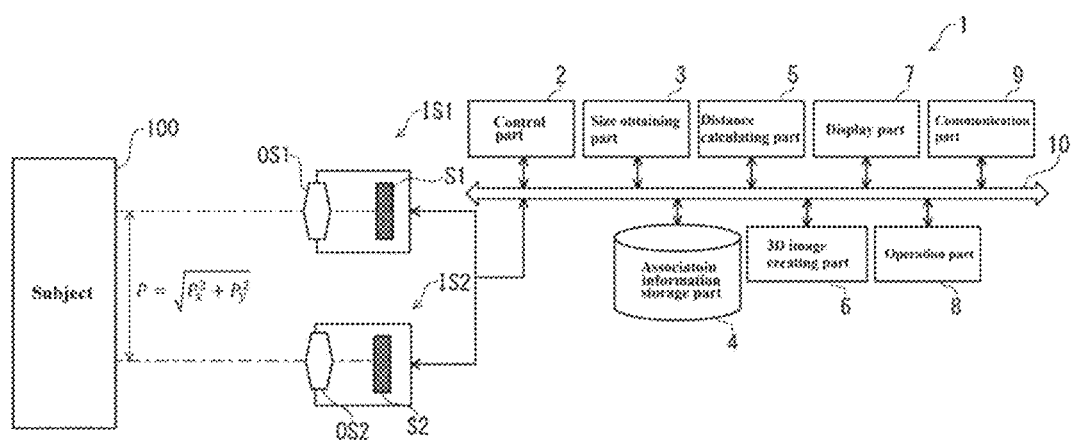
FIG. 1 is a block diagram schematically showing a distance measuring camera according to a first embodiment of the present invention.

FIGS. 5a-f are diagrams for explaining another example of the arrangements of the first imaging system and the second imaging system of the distance measuring camera shown in FIG. 1 and the changes of the positions of the feature points in the second image respectively corresponding to the feature points in the first image according to the distance to the subject.

Figure 6:
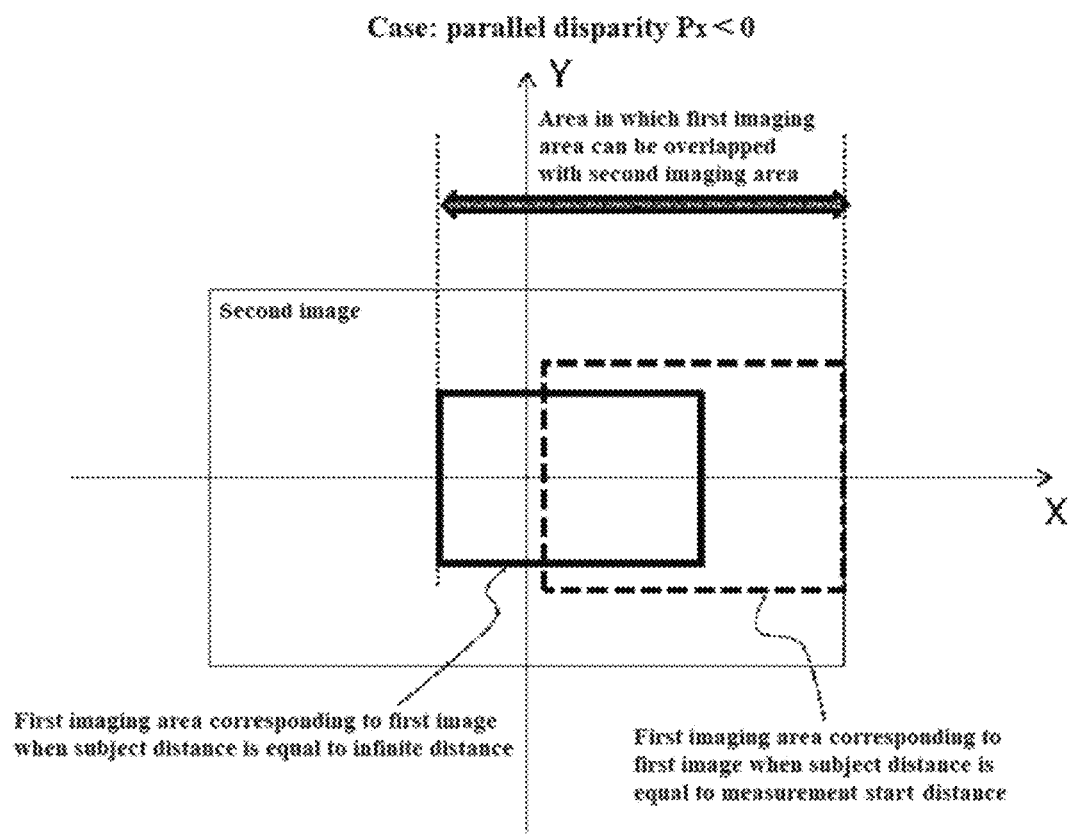

FIG. 6 is a diagram for explaining an area in which the first imaging area corresponding to the first image can be overlapped with the second imaging area corresponding to the second image in the example of the arrangements of the first imaging system and the second imaging system shown in FIGS. 5a-f.

Figure 7:
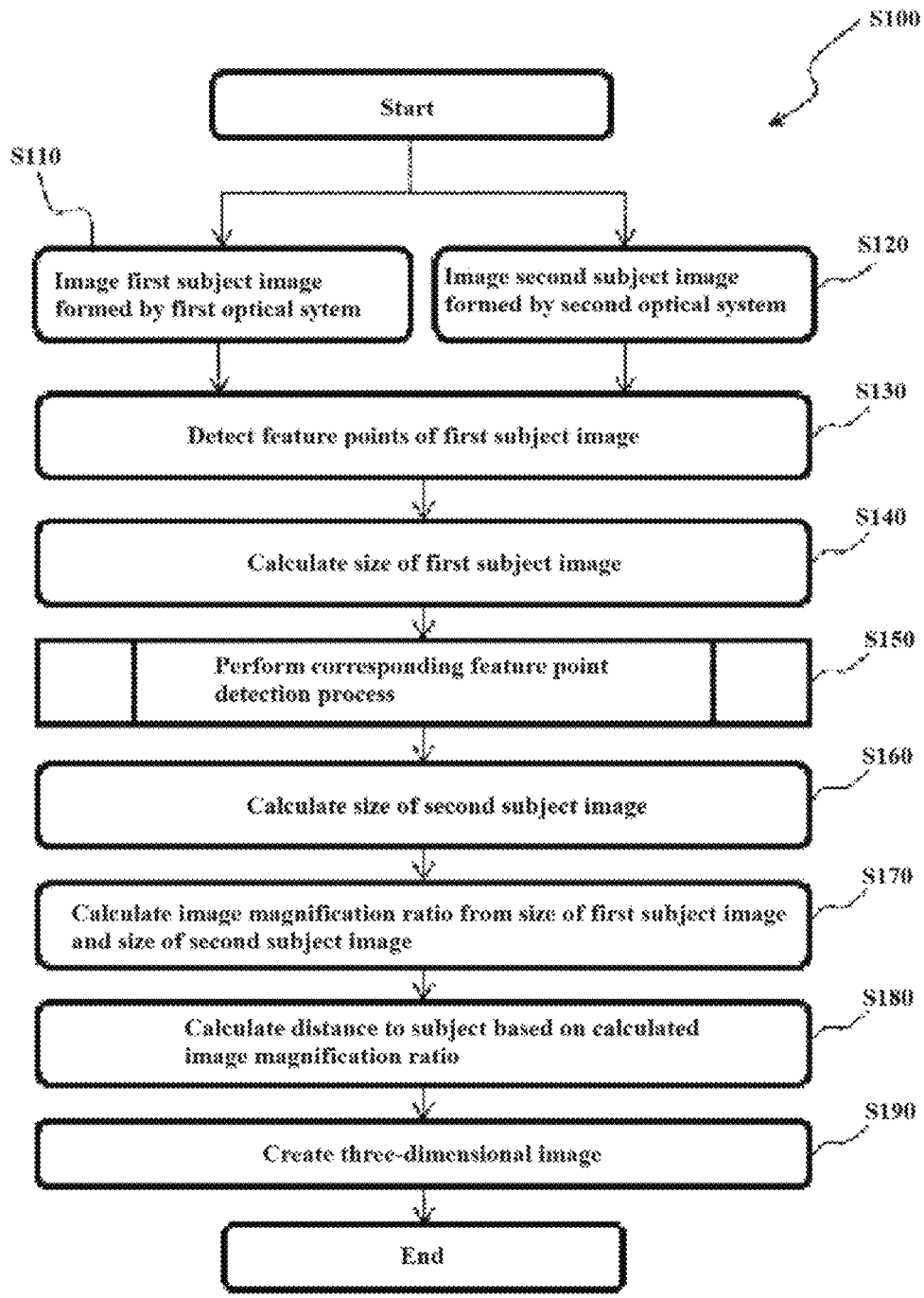

FIG. 7 is a flowchart for explaining a distance measuring method performed by the distance measuring camera according to the first embodiment of the present invention.

Figure 8:
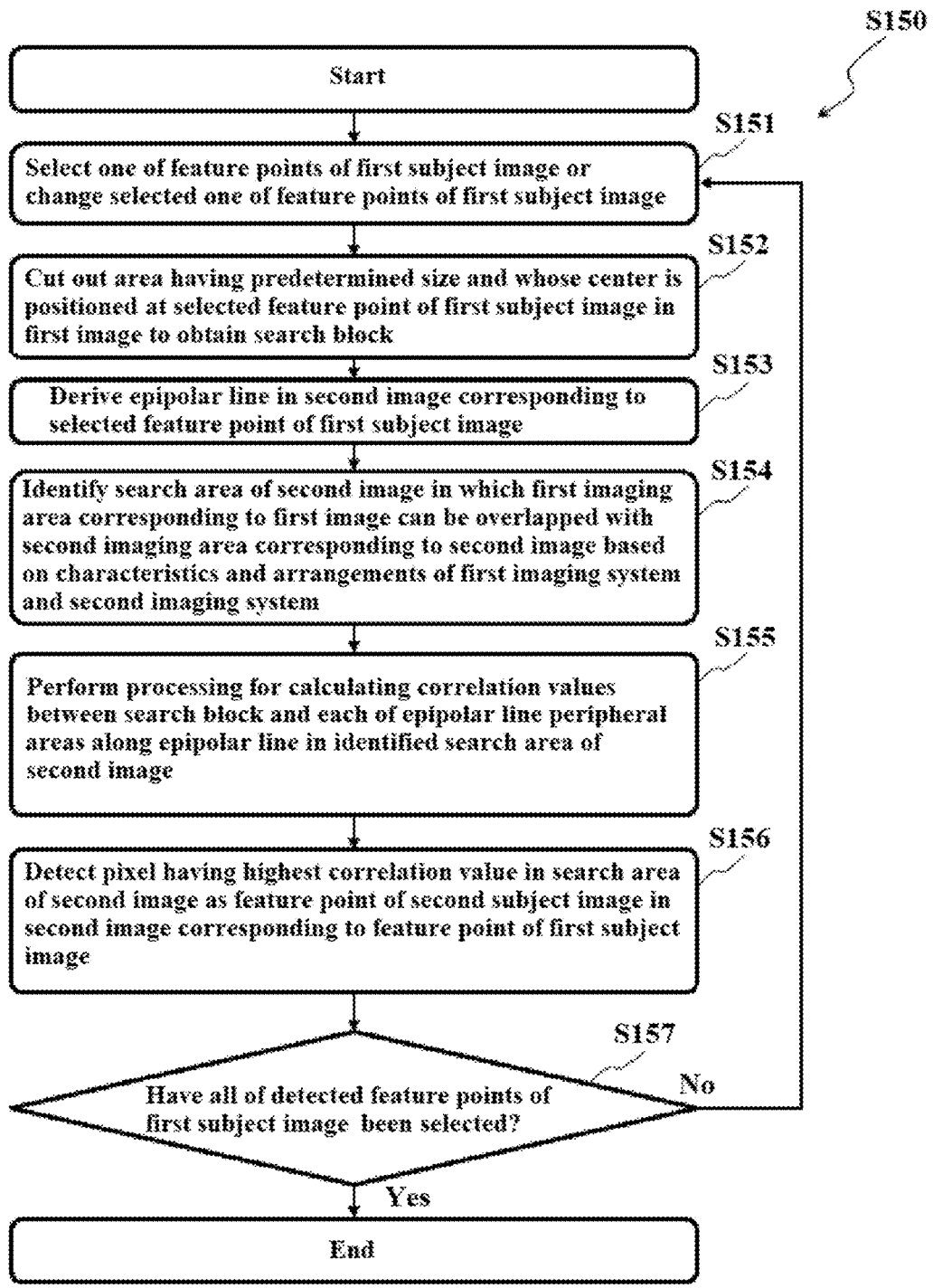

FIG. 8 is a flowchart showing details of a corresponding feature point detection process in the distance measuring method shown in FIG. 7.

FIGS. 9a-f are diagrams for explaining an example of arrangements of a first imaging system and a second imaging system of a distance measuring camera according to a second embodiment of the present invention and the changes of the positions of the feature points in the second image respectively corresponding to the feature points in the first image according to the distance to the subject.

Figure 10:
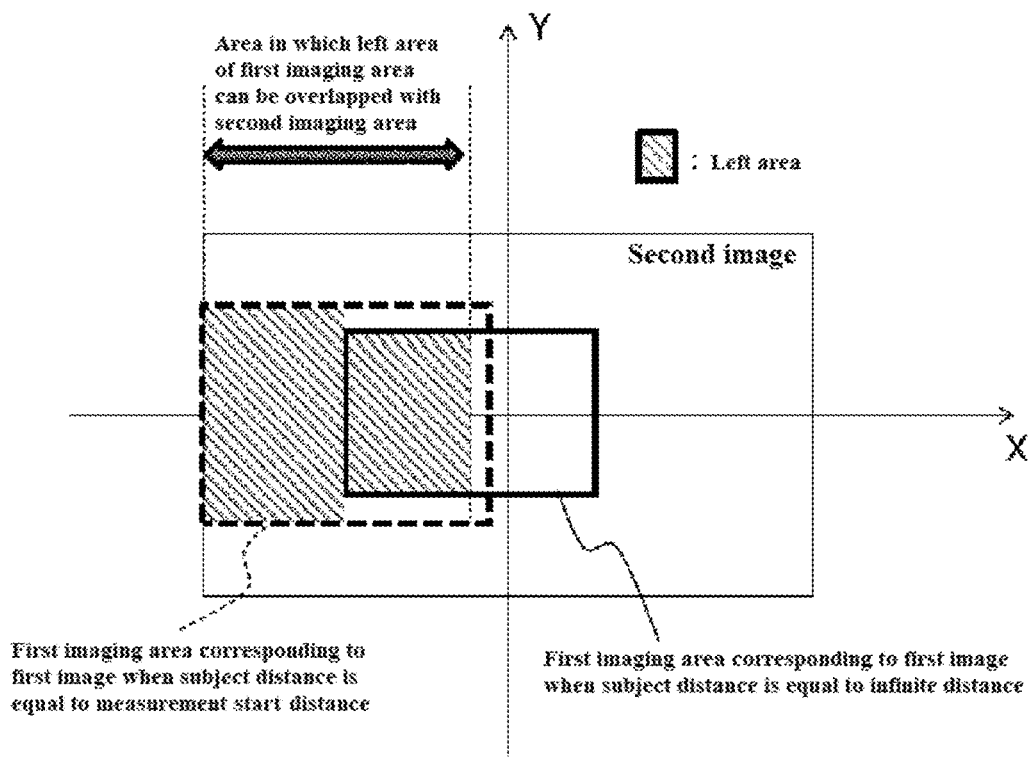

FIG. 10 is a diagram for explaining an area in which a left area of the first imaging area corresponding to the first image can be overlapped with the second imaging area corresponding to the second image in the example of the arrangements of the first imaging system and the second imaging system shown in FIGS. 9a-f.

FIGS. 11a-f is another diagram for explaining the changes of the positions of the feature points in the second image respectively corresponding to the feature points in the first image according to the distance to the subject in the example of the arrangements of the first imaging system and the second imaging system shown in FIGS. 9a-f.

Figure 12:
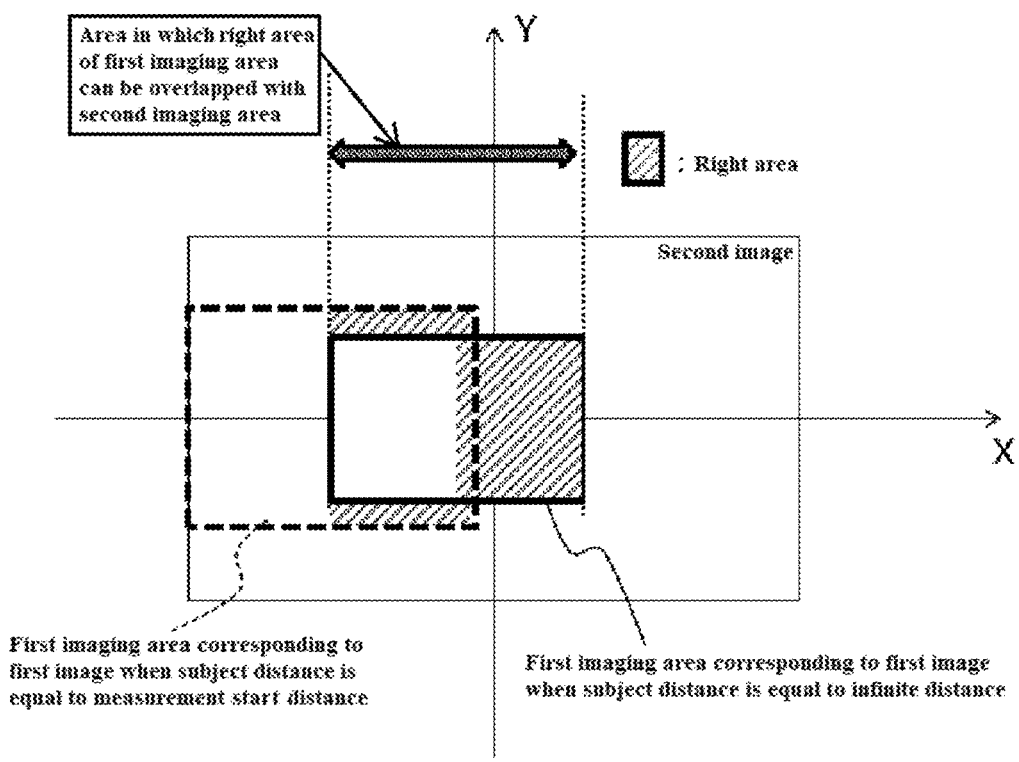

FIG. 12 is a diagram for explaining an area in which a right area of the first imaging area corresponding to the first image can be overlapped with the second imaging area corresponding to the second image in the example of the arrangements of the first imaging system and the second imaging system shown in FIGS. 9a-f.

Figure 13:
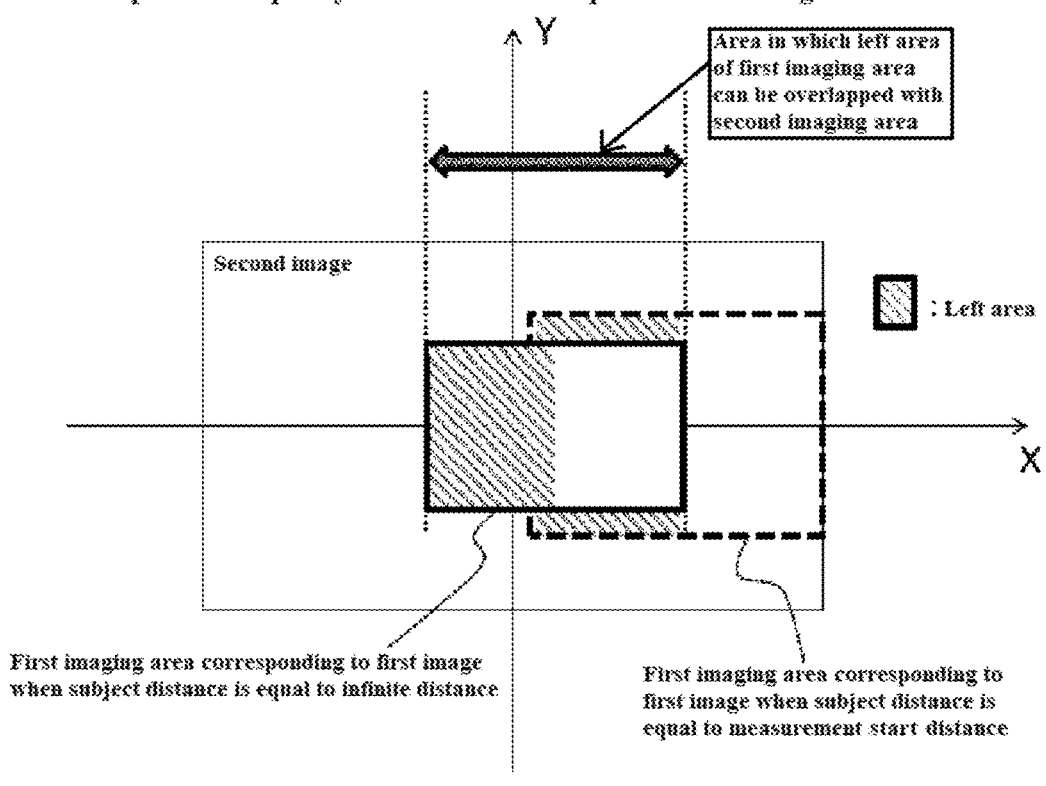

FIG. 13 is a diagram for explaining an area in which a left area of the first imaging area corresponding to the first image can be overlapped with the second imaging area corresponding to the second image in another example of the arrangements of the first imaging system and the second imaging system.

Figure 14:
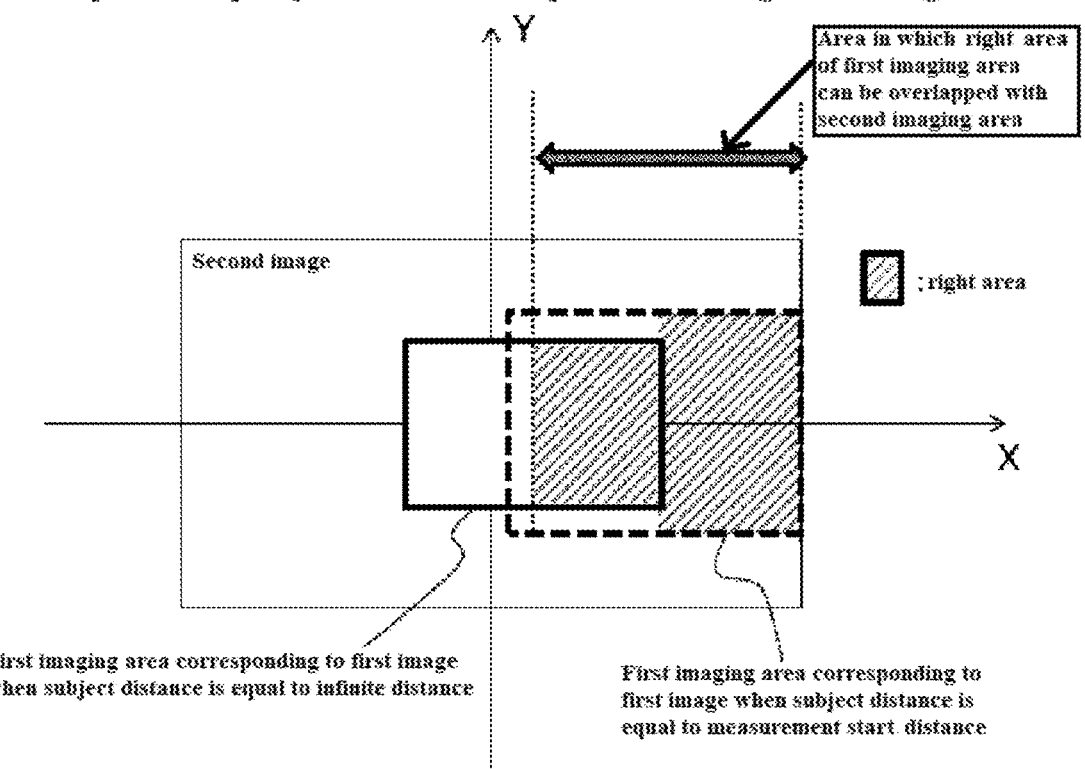

FIG. 14 is a diagram for explaining an area in which the right area of the first imaging area corresponding to the first image can be overlapped with the second imaging area corresponding to the second image in the other example of the arrangements of the first imaging system and the second imaging system.

DETAILED DESCRIPTION

First Embodiment

Figure 2:
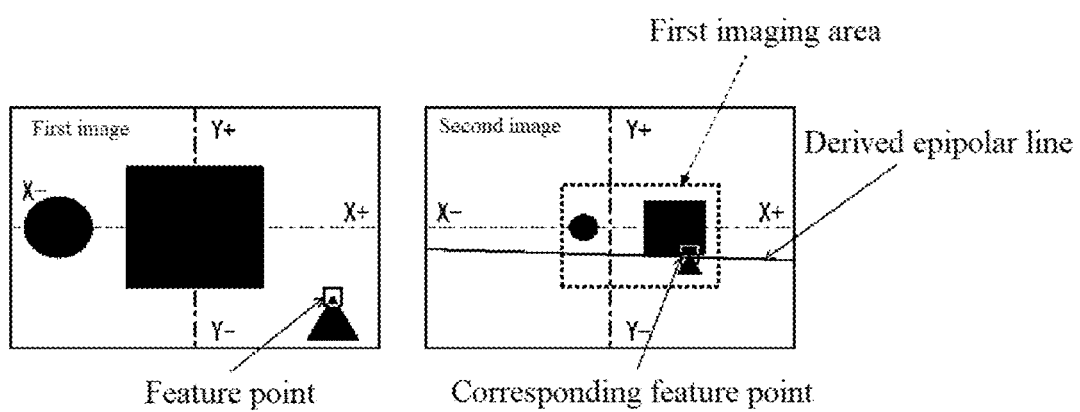
FIG. 2 is a schematic diagram showing an example of an epipolar line in a second image derived by the distance measuring camera shown in FIG. 1.

First, a distance measuring camera according to a first embodiment of the present invention will be described in detail with reference to FIGS. 1 to 6. FIG. 1 is a block diagram schematically showing the distance measuring camera according to the first embodiment of the present invention. FIG. 2 is a schematic diagram showing an example of an epipolar line in a second image derived by the distance measuring camera shown in FIG. 1. FIG. 3 is a diagram for explaining an example of arrangements of a first imaging system and a second imaging system of the distance measuring camera shown in FIG. 1 and changes of positions of feature points in the second image respectively corresponding to feature points in a first image according to a distance to a subject. FIG. 4 is a diagram for explaining an area in which a first imaging area corresponding to the first image can be overlapped with a second imaging area corresponding to the second image in the example of the arrangements of the first imaging system and the second imaging system shown in FIG. 3. FIG. 5 is a diagram for explaining another example of the arrangements of the first imaging system and the second imaging system of the distance measuring camera shown in FIG. 1 and the changes of the positions of the feature points in the second image respectively corresponding to the feature points in the first image according to the distance to the subject. FIG. 6 is a diagram for explaining an area in which the first imaging area corresponding to the first image can be overlapped with the second imaging area corresponding to the second image in the example of the arrangements of the first imaging system and the second imaging system shown in FIG. 5.

A distance measuring camera 1 according to the first embodiment of the present invention shown in FIG. 1 has a function of measuring a distance (subject distance) from the distance measuring camera 1 to a subject 100 by imaging the subject 100. More specifically, the distance measuring camera 1 has a function of measuring the distance from the distance measuring camera 1 to the subject 100 based on an image magnification ratio "MR" between at least two subject images respectively formed by at least two optical systems whose changes of magnifications of the subject images according to the distance to the subject 100 are different from each other. In this regard, although the distance measuring camera 1 includes the at least two optical systems whose changes of the magnifications of the subject images according to the distance to the subject 100 are different from each other, the following description will be provided with assuming that the distance measuring camera 1 includes a first optical system OS1 of a first imaging system IS1 and a second optical system OS2 of a second imaging system IS2 whose changes of magnifications of subject images according to the distance to the subject 100 are different from each other for the sake of simplifying the explanation.

The distance measuring camera 1 shown in FIG. 1 contains a control part 2 for performing control of the distance measuring camera 1, the first imaging system IS1 including the first optical system OS1 for collecting light from the subject 100 to form a first subject image and a first image sensor S1 for imaging the first subject image to obtain a first image (first image data) containing the first subject image, the second imaging system IS2 including the second optical system OS2 for collecting the light from the subject 100 to form a second subject image and arranged so as to be shifted from the first optical system OS1 by a distance "P" in a direction perpendicular to an optical axis direction of the first optical system OS1 and a second image sensor S2 for imaging the second subject image to obtain a second image (second image data) containing the second subject image, a size obtaining part 3 for obtaining a size of the first subject image and a size of the second subject image, an association information storage part 4 storing association information for associating an image magnification ratio "MR" between a magnification "$m_1$" of the first subject image and a magnification "$m_2$" of the second subject image with a distance to the subject 100, a distance calculating part 5 for calculating the distance to the subject 100 based on the image magnification ratio "MR" between the magnification "$m_1$" of the first subject image and the magnification "$m_2$" of the second subject image which is obtained as a ratio between the size of the first subject image and the size of the second subject image obtained by the size obtaining part 3, a three-dimensional (3D) image creating part 6 for creating a three-dimensional image of the subject 100 based on the first image obtained by the first image sensor S1 or the second image obtained by the second image sensor S2 and the distance to the subject 100 calculated by the distance calculating part 5, a display part 7 such as a liquid crystal panel for displaying arbitrary information, an operation part 8 for inputting an operation from a user, a communication part 9 for performing communication with external devices and a data bus 10 for transmitting and receiving data among components of the distance measuring camera 1.

In the distance measuring camera 1 of the present invention, the first optical system OS1 of the first imaging system IS1 and the second optical system OS2 of the second imaging system IS2 are configured and arranged so that a change of the magnification "$m_1$" of the first subject image contained in the first image obtained by imaging the subject 100 with the first imaging system IS1 according to the distance to the subject 100 is different from a change of the magnification "$m_2$" of the second subject image contained in the second image obtained by imaging the subject 100 with the second imaging system IS2 according to the distance to the subject 100.

For allowing the change of the magnification "$m_1$" of the first subject image according to the distance to the subject 100 to be different from the change of the magnification "$m_2$" of the second subject image according to the distance to the subject 100, it is necessary to satisfy that the first optical system OS1 and the second optical system OS2 are configured and arranged so as to satisfy at least one of the following three conditions.

(First condition) A focal length "$f_1$" of the first optical system OS1 and a focal length "$f_2$" of the second optical system OS2 are different from each other ("$f_1$"≠"$f_2$").

(Second condition) A distance "$EP_1$" from an exit pupil of the first optical system OS1 to an image formation position of the first subject image when the subject 100 is located at an infinite distance point and a distance "$EP_2$" from an exit pupil of the second optical system OS2 to an image formation position of the second subject image when the subject 100 is located at the infinite distance point are different from each other ("$EP_1$"≠"$EP_2$").

(Third condition) A difference (depth disparity) "D" in a depth direction (the optical axis direction) exists between a front principal point of the first optical system OS1 and a front principal point of the second optical system OS2 ("D"≠0).

In addition, even if at least one of the first to third conditions described above is satisfied, in a special case of satisfying a condition of "$f_1$"≠"$f_2$", "$EP_1$" "$EP_2$", "D"=0, "$f_1$"="$EP_1$" and "$f_2$"="$EP_2$", the image magnification ratio "MR" which is a ratio between the magnification "$m_1$" of the first subject image and the magnification "$m_2$" of the second subject image is not established as a function of the distance to the subject 100. Therefore, the first optical system OS1 and the second optical system OS2 are configured to further satisfy a fourth condition that the image magnification ratio "MR" is established as the function of the distance to the subject 100.

Since a principle for allowing the change of the magnification "$m_1$" of the first subject image according to the distance to the subject 100 to be different from the change of the magnification "$m_2$" of the second subject image according to the distance to the subject 100 and a principle for calculating the distance to the subject 100 based on the image magnification "MR" which is the ratio between the magnification "$m_1$" of the first subject image and the magnification "$m_2$" of the second subject image in the case where the first optical system OS1 and the second optical system OS2 satisfy the above-described conditions have been described in detail in the patent document 2 (JP 2017-241896) already filed by the present inventor and others, the description for these principles will be omitted from the specification. The entire content of the patent document 2 is hereby incorporated by reference for all purpose.

In the distance measuring camera 1 of the present invention, the first imaging system IS1 and the second imaging system IS2 are further configured and arranged so that an entire area of a first imaging area corresponding to the first image is contained within a second imaging area corresponding to the second image when the subject 100 located at a distance which is equal to or larger than a measurement start (MS) distance determined by arrangements and characteristics of the first imaging system IS1 and the second imaging system IS2 is imaged.

Specifically, the first imaging system IS1 and the second imaging system IS2 are configured and arranged so that the entire area of the first imaging area corresponding to the first image obtained by the first imaging system IS1 is contained within the second imaging area corresponding to the second image obtained by the second imaging system IS2 when the subject 100 located so as to be spaced apart from the first imaging system IS1 by the distance which is equal to or larger than the measurement start distance is imaged by the first imaging system IS1 and the second imaging system IS2.

For example, FIG. 2 shows one example of the first image and the second image. In FIG. 2, the entire area of the first imaging area corresponding to the first image is contained in the second imaging area corresponding to the second image. Here, the phrase of "the first imaging area corresponding to the first image" means an area of the real world corresponding to the entire area of the first image when the real world is imaged by the first imaging system IS1 to obtain the first image. Similarly, the phrase of "the second imaging area corresponding to the second image" means an area of the real world corresponding to an entire area of the second image when the real world is imaged by the second imaging system IS2 to obtain the second image. For example, in the example of FIG. 2, the first imaging area corresponding to the first image refers to an area of the real world corresponding to a certain area including a black circle, a black square and a black triangle and represented by the first image. Similarly, in the example of FIG. 2, the second imaging area corresponding to the second image refers to an area of the real world corresponding to a certain area represented by the second image. In the example of FIG. 2, the first imaging area is narrower than the second imaging area and the entire area of the first imaging area is contained within the second imaging area.

In the example of the first image and the second image shown in FIG. 2, the first imaging area corresponding to the first image is narrower than the second imaging area corresponding to the second image. Namely, an angle of view of the first imaging system IS1 used for obtaining the first image is narrower than an angle of view of the second imaging system IS2 used for obtaining the second image. Further, an imaging magnification of the first imaging system IS1 is larger than an imaging magnification of the second imaging system IS2.

In a case where a size of the first image sensor S1 of the first imaging system IS1 is equal to a size of the second image sensor S2 of the second imaging system IS2, it is possible to satisfy the requirement that the entire area of the first imaging area corresponding to the first image obtained by the first imaging system IS1 is contained within the second imaging area corresponding to the second image obtained by the second imaging system IS2 when the subject 100 located so as to be spaced apart from the first imaging system IS1 by the distance which is equal to or larger than the measurement start distance is imaged by the first imaging system IS1 and the second imaging system IS2 by configuring the first optical system OS1 and the second optical system OS2 so as to satisfy the following condition.

(Fifth condition) The focal length "$f_1$" of the first optical system OS1 is longer than the focal length "$f_2$" of the second optical system OS2 ("$f_1$">"$f_2$").

In a case where the size of the first image sensor S1 of the first imaging system IS1 is equal to the size of the second image sensor S2 of the second imaging system IS2 and the above-described fifth condition is satisfied, the angle of view of the first imaging system IS1 is narrower than the angle of view of the second imaging system IS2. Further, the imaging magnification of the first imaging system IS1 is larger than the imaging magnification of the second imaging system IS2. Thus, by configuring the first optical system OS1 and the second optical system OS2 so as to satisfy the above-described fifth condition, it is possible to satisfy the requirement that the entire area of the first imaging area corresponding to the first image obtained by the first imaging system IS1 is contained within the second imaging area corresponding to the second image obtained by the second imaging system IS2 when the subject 100 located so as to be spaced apart from the first imaging system IS1 by the distance which is equal to or larger than the measurement start distance is imaged by the first imaging system IS1 and the second imaging system IS2.

Thus, in the distance measuring camera 1 of the present invention, the first optical system OS1 and the second optical system OS2 are configured and arranged so as to satisfy the fourth condition, the fifth condition and at least one of the first to third conditions.

Next, the "measurement start distance" will be described with reference to FIGS. 3 and 5. In the specification, the phrase of "measurement start distance" refers to a distance from the first imaging system IS1 to the subject 100 which allows the distance measuring camera 1 of the present invention to perform the measurement for the distance to the subject 100.

One example of the arrangements of the first imaging system IS1 and the second imaging system IS2 is shown on the upper side of FIG. 3. Another example of the arrangements of the first imaging system IS1 and the second imaging system IS2 is shown in the upper side of FIG. 5. Two lines radially extending from each of the first imaging system IS1 and the second imaging system IS2 in the Y-axis direction in each of the upper sides of FIGS. 3 and 5 represent an angle of view of each of the first imaging system IS1 and the second imaging system IS2.

As shown in FIGS. 3 and 5, the entire area of the first imaging area corresponding to the first image obtained by the first imaging system IS1 (an entire area of an area covered by the angle of view of the first imaging system IS1) is contained within the second imaging area corresponding to the second image obtained by the second imaging system IS2 (an area covered by the angle of view of the second imaging system IS2) when the distance from the first imaging system IS1 to the subject 100 becomes equal to or larger than a certain distance. This certain distance from the first imaging system IS1 to the subject 100 is referred to as the "measurement start distance".

When the subject 100 located so as to be spaced apart from the first imaging system IS1 by a distance which is less than the measurement start distance is imaged by the first imaging system IS1 and the second imaging system IS2, there is a case where a feature point of the subject 100 contained in the first image obtained by the first imaging system IS1 is not contained in the second image obtained by the second imaging system IS2. In this case, it is impossible to detect a feature point of the second subject image contained in the second image corresponding to a feature point of the first subject image contained in the first image as described later and the distance measuring camera 1 cannot measure the distance to the subject 100. Thus, the distance measuring camera 1 of the present invention is configured to target the subject 100 located so as to be spaced apart from the first imaging system IS1 by the distance which is equal to or larger than the measurement start distance.

In the example of the arrangements of the first imaging system IS1 and the second imaging system IS2 shown in FIG. 3, a parallel disparity "$P_x$" in the x-axis direction in the drawing from the first imaging system IS1 to the second imaging system IS2 is positive ("$P_x$">0). In other words, in the example shown in FIG. 3, the second imaging system IS2 is located on the right side of the first imaging system IS1 in the drawing. In this case, the distance measurement start distance is a distance from the first imaging system IS1 to a plane which contains an intersection point between the left-side line representing the angle of view of the first imaging system IS1 and the left-side line representing the angle of view of the second imaging system IS2 and which is perpendicular to the optical axis of the first optical system OS1 of the first imaging system IS1.

In the other example of the arrangements of the first imaging system IS1 and the second imaging system IS2 shown in FIG. 5, the parallel disparity "$P_x$" in the x-axis direction in the drawing from the first imaging system IS1 to the second imaging system IS2 is negative ("$P_x$"<0). In other words, in the example shown in FIG. 5, the second imaging system IS2 is located on the left side of the first imaging system IS1 in the drawing. In this case, the distance start distance is a distance from the first imaging system IS1 to a plane which contains an intersection point between the right-side line representing the angle of view of the first imaging system IS1 and the right-side line representing the angle of view of the second imaging system IS2 and which is perpendicular to the optical axis of the first optical system OS1 of the first imaging system IS1.

In each of the examples shown in FIGS. 3 and 5, when the subject 100 is located so as to be spaced apart from the first imaging system IS1 by the distance which is equal to or larger than the measurement start distance, the entire area of the first imaging area corresponding to the first image obtained by the first imaging system IS1 is contained within the second imaging area corresponding to the second image obtained by the second imaging system IS2.

The distance measuring camera 1 of the present invention can use the first imaging system IS1 and the second imaging system IS2 as described above to calculate the distance to the subject 100 based on the image magnification ratio "MR" which is the ratio between the magnification "$m_1$" of the first subject image and the magnification "$m_2$" of the second subject image and reduce a processing time for calculating the distance to the subject 100.

Hereinafter, each component of the distance measuring camera 1 will be described in detail with referring back to FIG. 1. The control part 2 transmits and receives various data and various instructions to and from the respective components through the data bus 10 to perform the control of the distance measuring camera 1. The control part 2 includes a processor for executing arithmetic processing and a memory storing data, programs, modules and the like required for performing the control of the distance measuring camera 1. The processor of the control part 2 can perform the control of the distance measuring camera 1 by using the data, programs, modules and the like stored in the memory. Further, the processor of the control part 2 can provide a desired function by using each component of the distance measuring camera 1. For example, the processor of the control part 2 can use the distance calculating part 5 to perform processing for calculating the distance to the subject 100 based on the image magnification ratio "MR" between the magnification "$m_1$" of the first subject image and the magnification "$m_2$" of the second subject image.

For example, the processor of the control part 2 is one or more operation units such as microprocessors, microcomputers, microcontrollers, digital signal processors (DSPs), central processing units (CPUs), memory control units (MCUs), graphic processing units (GPUs), state machines, logic circuitries, application specific integrated circuits (ASICs) and combinations thereof that can perform operational processes such as signal manipulation based on computer-readable instructions. Among other capabilities, the processor of the control part 2 is configured to fetch computer-readable instructions (such as data, programs and modules) stored in the memory of the control part 2 to perform arithmetic operation, signal control and signal manipulation.

The memory of the control part 2 is a removable or non-removable computer-readable medium containing volatile memories (such as RAMs, SRAMs and DRAMs), non-volatile memories (such as ROM, EPROMs, EEPROM, flash memories, hard disks, optical discs, CD-ROMs, digital versatile discs (DVDs), blue-ray discs (BDs), magnetic cassettes, magnetic tapes and magnetic disks) and combinations thereof.

The memory of the control part 2 stores parameters related to the configurations and the arrangements of the first imaging system IS1 and the second imaging system IS2. The parameters stored in the memory of the control part 2 are related to the configurations and arrangements of the first imaging system IS1 and the second imaging system IS2 and contains the focal length "$f_1$" of the first optical system OS1 of the first imaging system IS1, the focal length "$f_2$" of the second optical system OS2 of the second imaging system IS2, the distance "$EP_1$" from the exit pupil of the first optical system OS1 to the image formation position of the first subject image when the subject 100 is located at the infinite distance point, the distance "$EP_2$" from the exit pupil of the second optical system OS2 to the image formation position of the second subject image when the subject 100 is located at the infinite distance point, the parallel disparity "$P_x$" in the x-axis direction, the parallel disparity "$P_y$" in the y-axis direction and the depth disparity "D" between the first optical system OS1 and the second optical system OS2, a distance "$a_{FD1}$" from the front principal point of the first optical system OS1 to the subject 100 when the first subject image is in the best focus on an imaging surface of the first image sensor S1 and a distance "$a_{FD2}$" from the front principal point of the second optical system OS2 to the subject 100 when the second subject image is in the best focus on an imaging surface of the second image sensor S2.

These parameters are fixed values determined at the time of configuring and arranging the first imaging system IS1 and the second imaging system IS2 and are referred by the processor of the control part 2 when the distance to the subject 100 is calculated based on the image magnification ratio "MR" between the magnification "$m_1$" of the first subject image and the magnification "$m_2$" of the second subject image.

The first imaging system IS1 includes the first optical system OS1 and the first image sensor S1. The first optical system OS1 has a function of collecting the light from the subject 100 to form the first subject image on the imaging surface of the first image sensor S1. The first image sensor S1 has a function of imaging the first subject image formed on the imaging surface thereof to obtain the first image (first image data) containing the first subject image. The second imaging system IS2 includes the second optical system OS2 and the second image sensor S2. The second optical system OS2 has a function of collecting the light from the subject 100 to form the second subject image on the imaging surface of the second image sensor S2. The second image sensor S2 has a function of imaging the second subject image formed on the imaging surface thereof to obtain the second image (second image data) containing the second subject image.

As described above, the first optical system OS1 and the second optical system OS2 are configured and arranged so as to satisfy the fourth condition and at least one of the first to third conditions described above. Thus, in the distance measuring camera 1 of the present invention, the change of the magnification "$m_1$" of the first subject image formed by the first optical system OS1 according to the distance to the subject 100 is different from the change of the magnification "$m_2$" of the second subject image formed by the second optical system OS2 according to the distance to the subject. The image magnification ratio "MR" which is the ratio between the magnification "$m_1$" of the first subject image formed by the first optical system OS1 and the magnification "$m_2$" of the second subject image formed by the second optical system OS2 is used for calculating the distance to the subject 100.

Further, although an optical axis of the first optical system OS1 and an optical axis of the second optical system OS2 are parallel to each other, the optical axis of the first optical system OS1 and the optical axis of the second optical system OS2 do not coincide with each other as illustrated. Further, the second optical system OS2 is arranged so as to be shifted from the first optical system OS1 by a distance "P"=$("P_x^2"+"P_y^2")^{1/2}$ in a direction perpendicular to the optical axis direction of the first optical system OS1. Here, "$P_x$" is the parallel disparity in the x-axis direction between the first optical system OS1 and the second optical system OS2 when the z axis is defined as the optical axes of the first optical system OS1 and the second optical system OS2. Similarly, "$P_y$" is the parallel disparity in the y-axis direction between the first optical system OS1 and the second optical system OS2 when the z axis is defined as the optical axes of the first optical system OS1 and the second optical system OS2.

Further, the size of the first image sensor S1 of the first imaging system IS1 is equal to the size of the second image sensor S2 of the second imaging system IS2 and the first optical system OS1 and the second optical system OS2 are configured so as to satisfy the above-described fifth condition ("$f_1$">"$f_2$"). Thus, when the subject 100 located so as to be spaced apart from the first imaging system IS1 by the distance which is equal to or larger than the measurement start distance is imaged by the first imaging system IS1 and the second imaging system IS2, the entire area of the first imaging area corresponding to the first image obtained by the first imaging system IS1 is contained within the second imaging area corresponding to the second image obtained by the second imaging system IS2.

Although the first image sensor S1 and the first optical system OS1 constituting the first imaging system IS1 are provided in one housing and the second image sensor S2 and the second optical system OS2 constituting the second imaging system IS2 are provided in another housing in the illustrated aspect, the present invention is not limited thereto. The scope of the present invention involves an aspect in which all of the first optical system OS1, the second optical system OS2, the first image sensor S1 and the second image sensor S2 are provided in one housing.

Each of the first image sensor S1 and the second image sensor S2 may be a color image sensor such as a CMOS image sensor or a CCD image sensor having a color filter such as an RGB primary color filter and a CMY complementary color filter arranged in any pattern such as a bayer arrangement or a monochrome image sensor having no color filter. In this case, the first image obtained by the first image sensor S1 and the second image obtained by the second image sensor S2 are color or monochrome luminance information of the subject 100.

Further, each of the first image sensor S1 and the second image sensor S2 may be a phase sensor for obtaining phase information of the subject 100. In this case, the first image obtained by the first image sensor S1 and the second image obtained by the second image sensor S2 are phase information of the subject 100.

The first subject image is formed on the imaging surface of the first image sensor S1 by the first optical system OS1 and then the first image sensor S1 obtains the first image containing the first subject image. The obtained first image is transmitted to the control part 2 and the size obtaining part 3 through the data bus 10. Similarly, the second subject image is formed on the imaging surface of the second image sensor S2 by the second optical system OS2 and then the second image sensor S2 obtains the second image containing the second subject image. The obtained second image is transmitted to the control part 2 and the size obtaining part 3 through the data bus 10.

The first image and the second image transmitted to the size obtaining part 3 are used for obtaining the size of the first subject and the size of the second subject. On the other hand, the first image and the second image transmitted to the control part 2 are used for image displaying with the display part 7 and the communication of image signals with the communication part 9.

The size obtaining part 3 has a function of obtaining the size of the first subject and the size of the second subject from the first image containing the first subject image and the second image containing the second subject image. Specifically, the size obtaining part 3 detects a plurality of feature points of the first subject image in the first image and measures a distance between the plurality of detected feature points of the first subject image to obtain the size of the first subject image. Further, the size obtaining part 3 detects a plurality of feature points of the second subject image in the second image respectively corresponding to the plurality of detected feature points of the first subject image and measures a distance between the plurality of detected feature points of the second subject image to obtain the size of the second subject image.

In one example, the size obtaining part 3 subjects a filtering process such as a Canny method on the first image to extract edge portions of the first subject image in the first image. After that, the size obtaining part 3 detects some of the extracted edge portions of the first subject image as the plurality of feature points of the first subject image and measures the distance between the plurality of feature points to obtain the size of the first subject image. In this case, the size obtaining part 3 may detect edge portions corresponding to both ends in the height direction of the first subject image as the plurality of feature points of the first subject image and obtain the distance between the plurality of feature points as the size (image height) of the first subject image or may detect edge portions corresponding to both ends in the width direction of the first subject image as the plurality of feature points of the first subject image and obtain the distance between the plurality of feature points as the size (image width) of the first subject image.

After the size of the first subject image is obtained, the size obtaining part 3 performs a corresponding feature point detection process for detecting the plurality of feature points of the second subject image in the second image respectively corresponding to the plurality of detected feature points of the first subject image. The size obtaining part 3 utilizes an epipolar line based on the epipolar geometry in the corresponding feature point detection process.

As is well known, the epipolar geometry ensures that a feature point in a second image obtained by one of two imaging systems corresponding to a feature point in a first image obtained by the other one of the two imaging systems always exists on an epipolar line in the second image derived based on characteristics (focal lengths, exit pupil positions, etc.) and arrangements of the two imaging systems and a position of the feature point in the first image. Therefore, in the corresponding feature point detection process, it is possible to detect the feature point in the second image corresponding to the first image by searching pixels on the derived epipolar line in the second image without searching an entire area of the second image.

Specifically, the size obtaining part 3 receives the first image from the first image sensor S1 and receives the second image from the second image sensor S2. After that, the size obtaining part 3 detects the plurality of arbitrary feature points of the first subject image in the first image. A method of the size obtaining part 3 for detecting the plurality of arbitrary feature points of the first subject image in the first image is not particularly limited. The size obtaining part 3 can use various methods known in the art to detect the plurality of arbitrary feature points of the first subject image in the first image. A coordinate ($x_1$, $y_1$) of each of the feature points detected by the size obtaining part 3 is temporarily stored in the memory of the control part 2.

After that, the size obtaining part 3 refers to the parameters stored in the memory of the control part 2 to derive an epipolar line corresponding to a selected one of the feature points of the first subject image. In this regard, a method of the size obtaining part 3 for deriving the epipolar line based on the characteristics and the arrangements of the first imaging system IS and the second imaging system IS2 and the coordinate $(x_1, y_1)$ of the selected one of the feature points of the first subject image in the first image. The size obtaining part 3 can use any method known in the field of the epipolar geometry to derive the epipolar line in the second image.

FIG. 2 shows an example of the derived epipolar line in the second image. As shown in FIG. 2, the epipolar line in the second image corresponding to the selected one of the feature points of the first subject image is derived based on the characteristics and the arrangements of the first imaging system IS1 and the second imaging system IS2 and the position (coordinate) of the selected one of the feature points of the first subject image in the first image.

The size obtaining part 3 searches pixels on the derived epipolar line in the second image to detect the feature point of the second subject image in the second image corresponding to the selected one of the feature points of the first subject image. As described above, the size obtaining part 3 uses the epipolar line based on the epipolar geometry in the corresponding feature point detection process to search the feature point of the second subject image in the second image corresponding to the selected one of the feature points of the first subject image. Thus, the size obtaining part 3 can detect the feature point of the second subject image in the second image corresponding to the selected one of the feature points of the first subject image in the first image by searching the pixels on the derived epipolar line without searching the entire area of the second image. With this configuration, it is possible to reduce the processing time for calculating the distance to the subject 100 based on the image magnification ratio "MR" between the magnification "$m_1$" of the first subject image and the magnification "$m_2$" of the second subject image.

In addition to the use of the epipolar line based on the epipolar geometry as described above, the size obtaining part 3 limits an area of the second image to be searched in the corresponding feature point detection process to further reduce the processing time for calculating the distance to the subject 100 based on the image magnification ratio "MR" between the magnification "$m_1$" of the first subject image and the magnification "$m_2$" of the second subject image.

The limitation of the area of the second image to be searched in the corresponding feature point detection process will be described in detail with reference to FIGS. 3 to 6. The present inventor has found a phenomenon that an area in which the first imaging area corresponding to the first image obtained by the first imaging system IS1 can be overlapped with the second imaging area corresponding to the second image obtained by the second imaging system IS2 is not the entire area of the second image and limited to a specified area of the second image. Further, from this phenomenon, the present inventor has gotten an idea that the search for the pixels on the epipolar line should be performed in the specified area in which the first imaging area corresponding to the first image can be overlapped with the second imaging area corresponding to the second image obtained by the second imaging system IS2 and made the present invention. Hereinafter, description will be given to the phenomenon that the area in which the first imaging area corresponding to the first image obtained by the first imaging system IS1 can be overlapped with the second imaging area corresponding to the second image obtained by the second imaging system IS2 is not the entire area of the second image and limited to the specified area of the second image.

As described above, in the distance measuring camera 1 of the present invention, the first imaging system IS1 and the second imaging system IS2 are configured so that the entire area of the first imaging area corresponding to the first image obtained by the first imaging system IS1 is contained within the second imaging area corresponding to the second image obtained by the second imaging system IS2 when the subject 100 located so as to be spaced apart from the first imaging system IS1 by the distance which is equal to or larger than the measurement start distance is imaged by the first imaging system IS1 and the second imaging system IS2.

In the example of the arrangements of the first imaging system IS1 and the second imaging system IS2 shown in FIG. 3, the second imaging system IS2 is located on the right side of the first imaging system IS1. When the subject 100 is located so as to be spaced apart from the first imaging system IS1 by a distance which is equal to the measurement start distance ("the subject distance" "the measurement start distance"), a feature point in the second image (a round point in the section (a) of FIG. 3) corresponding to a feature point existing at a left-side edge of the first image exists at a left-side edge of the second image as shown in the section (a) of FIG. 3.

When the subject 100 is located so as to be spaced apart from the first imaging system IS1 by an arbitrary distance which is larger than the measurement start distance ("the subject distance"="the arbitrary distance"), the feature point in the second image (the round point in the section (b) of FIG. 3) corresponding to the feature point existing at the left-side edge of the first image exists at a position shifted from the left-side edge of the second image toward the right side as shown in the section (b) of FIG. 3.

Further, when the subject 100 is located at the infinite distance point ("the subject distance"="the infinite distance"), the feature point (the round point in the section (c) of FIG. 3) in the second image corresponding to the feature point existing at the left-side edge of the first image exists at a position further shifted from the position shown in the section (b) of FIG. 3 toward the right side as shown in the section (c) of FIG. 3.

As described above, the feature point in the second image corresponding to the feature point existing at the left-side edge of the first image is shifted from the position shown in the section (a) of FIG. 3 to the position shown in the section (c) of FIG. 3 in the x-axis direction according to the distance from the first imaging system IS1 to the subject 100.

Similarly, when the subject 100 is located so as to be spaced apart from the first imaging system IS1 by the distance which is equal to the measurement start distance ("the subject distance" "the measurement start distance"), a feature point in the second image (a square point in the section (d) of FIG. 3) corresponding to a feature point existing at a right-side edge of the first image exists at a position shifted from the left-side edge of the second image toward the right side as shown in the section (d) of FIG. 3.

When the subject 100 is located so as to be spaced apart from the first imaging system IS1 by the arbitrary distance which is larger than the measurement start distance ("the subject distance" "the arbitrary distance"), the feature point in the second image (the square point of the section (e) of FIG. 3) corresponding to the feature point existing at the right-side edge of the first image exists at a position further shifted from the position shown in the section (d) of FIG. 3 toward the right side as shown in the section (e) of FIG. 3.

Further, when the subject 100 is located at the infinite distance point ("the subject distance"="the infinite distance"), the feature point in the second image (the square point in the section (f) of FIG. 3) corresponding to the feature point existing at the right-side edge of the first image exists at a position further shifted from the position shown in the section (e) of FIG. 3 toward the right side as shown in the section (f) of FIG. 3.

Regarding the x-axis direction, the feature point in the second image corresponding to the feature point existing at the right-side edge of the first image is shifted from the position shown in the section (d) of FIG. 3 to the position shown in the section (f) of FIG. 3 according to the distance from the first imaging system IS1 to the subject 100 as described above.

Since an arbitrary feature point in the first image exists at a certain position between the left-side edge and the right-side edge of the first image in the x-axis direction, an x-axis position of a feature point in the second image corresponding to the arbitrary feature point in the first image should be located within an area between the position shown in the section (a) of FIG. 3 and the position shown in the section (f) of FIG. 3.

Therefore, an area in which the feature point in the second image corresponding to the arbitrary feature point in the first image can be located, that is, an area in which the first imaging area corresponding to the first image can be overlapped with the second imaging area corresponding to the second image is not the entire area of the second image and limited to the specific area of the second image.

FIG. 4 is a diagram for explaining the area in which the first imaging area corresponding to the first image can be overlapped with the second imaging area corresponding to the second image in the example of the arrangements of the first imaging system and the second imaging system shown in FIG. 3.

Regarding the x-axis direction, the area in which the first imaging area corresponding to the first image can be overlapped with the second imaging area corresponding to the second image is equivalent to an area between the position of the feature point in the second image corresponding to the feature point existing at the left-side edge of the first image when the distance to the subject 100 is equal to the measurement start distance (this position is shown in the section (a) of FIG. 3) and the position of the feature point in the second image corresponding to the feature point existing at the right-side edge of the first image when the distance to the subject 100 is equal to the infinite distance (this position is shown in the section (f) of FIG. 3).

When the distance from the first imaging system IS1 to the subject 100 falls within the range between the measurement start distance and the infinite distance, the x-axis position of the feature point in the first image always exists in the area of the second image in which the first imaging area corresponding to the first image can be overlapped with the second imaging area corresponding to the second image as shown in FIG. 4. Therefore, it is unnecessary to search all of the pixels on the epipolar line in the entire area of the second image when the search for the pixels on the derived epipolar line in the second image is performed in the corresponding feature point detection process and it is sufficient to search the pixels on the epipolar line only in a search area of the second image in which the first imaging area corresponding to the first image can be overlapped with the second imaging area corresponding to the second image.

In the other example of the arrangements of the first imaging system IS1 and the second imaging system IS2 shown in FIG. 5, the second imaging system IS2 is located on the left side of the first imaging system IS1. When the subject 100 is located so as to be spaced apart from the first imaging system IS1 by a distance which is equal to the measurement start distance ("the subject distance" "the measurement start distance"), a feature point in the second image (a round point in the section (a) of FIG. 5) corresponding to a feature point existing at a left-side edge of the first image exists at a position shifted from a right-side edge of the second image toward the left side as shown in the section (a) of FIG. 5.

When the subject 100 is located so as to be spaced apart from the first imaging system IS1 by an arbitrary distance which is larger than the measurement start distance ("the subject distance"="the arbitrary distance"), the feature point in the second image (the round point in the section (b) of FIG. 5) corresponding to the feature point existing at the left-side edge of the first image exists at a position further shifted from the position shown in the section (a) of FIG. 5 toward the left side as shown in the section (b) of FIG. 5.

Further, when the subject 100 is located so as to be spaced apart from the first imaging system IS1 by the infinite distance ("the subject distance"="the infinite distance"), the feature point in the second image (the round point in the section (c) of FIG. 5) corresponding to the feature point existing at the left-side edge of the first image exists at a position further shifted from the position shown in the section (b) of FIG. 5 to the left side as shown in the section (c) of FIG. 5.

As described above, the feature point in the second image corresponding to the feature point existing at the left-side edge of the first image is shifted from the position shown in the section (a) of FIG. 5 to the position shown in the section (c) of FIG. 5 in the x-axis direction according to the distance from the first imaging system IS1 to the subject 100.

Similarly, when the subject 100 is located so as to be spaced apart from the first imaging system IS1 by the distance equal to the measurement start distance ("the subject distance"="the measurement start distance"), a feature point in the second image (a square point in the section (d) of FIG. 5) corresponding to a feature point existing at the right-side edge of the first image exists at a right-side edge of the second image as shown in the section (d) of FIG. 5.

When the subject 100 is located so as to be spaced apart from the first imaging system IS1 by the arbitrary distance which is larger than the measurement start distance ("the subject distance" "the arbitrary distance"), the feature point in the second image (the square point in the section (e) of FIG. 5) corresponding to the feature point existing at the right-side edge of the first image exists at a position shifted from the position shown in the section (d) of FIG. 5 toward the left side as shown in the section (e) of FIG. 5.

Further, when the subject 100 is located so as to be spaced apart from the first imaging system IS1 by the infinite distance ("the subject distance"="the infinite distance"), the feature point in the second image (the square point in the section (f) of FIG. 5) corresponding to the feature point existing at the right-side edge of the first image exists at a position further shifted from the position shown in the section (e) of FIG. 5 toward the left side as shown in the section (f) of FIG. 5.

Regarding the x-axis direction, the feature point in the second image corresponding to the feature point existing at the right-side edge of the first image is shifted from the right-side edge shown in the section (d) of FIG. 5 to the position shown in the section (f) of FIG. 5 according to the distance from the first imaging system IS1 to the subject 100.

Since an arbitrary feature point in the first image exists at a certain position between the left-side edge and the right-side edge of the first image in the x-axis direction, an x-axis position of a feature point in the second image corresponding to the arbitrary feature point in the first image should be located within an area between the position shown in the section (c) of FIG. 5 and the position shown in the section (d) of FIG. 5.

Therefore, an area in which the feature point in the second image corresponding to the arbitrary feature point in the first image can be located, that is, an area in which the first imaging area corresponding to the first image can be overlapped with the second imaging area corresponding to the second image is not the entire area of the second image but a limited area of the second image.

FIG. 6 shows the area in which the first imaging area corresponding to the first image can be overlapped with the second imaging area corresponding to the second image in the other example of the arrangements of the first imaging system IS1 and the second imaging system shown IS2 in FIG. 5.

Regarding the x-axis direction, the area in which the first imaging area corresponding to the first image can be overlapped with the second imaging area corresponding to the second image is equivalent to an area between the position of the feature point in the second image corresponding to the feature point existing at the left-side edge of the first image when the distance to the subject 100 is equal to the infinite distance (this position is shown in the section (c) of FIG. 5) and the position of the feature point in the second image corresponding to the feature point existing at the right-side edge of the first image when the distance to the subject 100 is equal to the measurement start distance (this position is shown in the section (d) of FIG. 5).

As described above, based on the phenomenon that the area in which the first imaging area corresponding to the first image can be overlapped with the second imaging area corresponding to the second image is not the entire area of the second image but the limited area of the second image, the size obtaining part 3 limits the area of the second image in which the search for the pixels on the epipolar line is performed in the corresponding feature point detection process.

The area in which the first imaging area corresponding to the first image can be overlapped with the second imaging area corresponding to the second image shown in FIGS. 4 and 6 (hereinafter, this area is referred to as a "search area" of the second image) can be identified from the characteristics and the arrangements of the first imaging system IS1 and the second imaging system IS2 (more specifically, the angle of view of the first imaging system IS1, the angle of view of the second imaging system IS2 and the parallel disparities ($P_x$, $P_y$) and the depth disparity "D" between the first imaging system IS1 and the second imaging system IS2) based on the geometric optics theory. Since the characteristics and the arrangements of the first imaging system IS1 and the second imaging system IS2 are determined at the time of configuring the distance measuring camera 1, the size obtaining part 3 can identify the area of the second image (the search area of the second image) in which the first imaging area corresponding to the first image can be overlapped with the second imaging area corresponding to the second image based on the characteristics and the arrangements of the first imaging system IS1 and the second imaging system IS2.

In the corresponding feature point detecting process, the size obtaining part 3 identifies the search area of the second image in which the first imaging area corresponding to the first image can be overlapped with the second imaging area corresponding to the second image based on the characteristics and the arrangements of the first imaging system IS1 and the second imaging system IS2 and searches the pixels on the derived epipolar line only in the search area of the second image to detect the feature point of the second subject image contained in the second image corresponding to the feature point of the first subject image contained in the first image.

As described above, in the corresponding feature point detection process performed by the size obtaining part 3, the area of the second image in which the search for the pixels on the epipolar line should be performed is limited to the search area of the second image in which the first imaging area corresponding to the first image can be overlapped with the second imaging area corresponding to the second image. Therefore, since the area to be searched is limited in the distance measuring camera 1 of the present invention as compared with the case where the search for the pixels on the epipolar line is performed in the entire area of the second image, it is possible to reduce the processing time for the corresponding feature point detection process. As a result, it is possible to further reduce the processing time for calculating the distances to the subject 100 based on the image magnification ratio "MR" between the magnification "$m_1$" of the first subject image and the magnification "$m_2$" of the second subject image.

As described above, the size obtaining part 3 performs the search for the pixels on the derived epipolar line only in the search area of the second image. Specifically, the size obtaining part 3 first refers to the coordinates ($x_1$, $y_1$) of the plurality of detected feature points of the first subject image stored in the memory of the control part 2 and then selects one of the detected feature points of the first subject image. Next, the size obtaining part 3 cuts out an area having a predetermined size and whose center is positioned at the selected feature point (for example, 5×5 pixel area, 7×7 pixel area or the like whose center is positioned at the selected feature point) from the first image to obtain a search block for the selected feature point. This search block is used for searching a feature point of the second subject image in the second image corresponding to the selected feature point of the first subject. The obtained search block is temporarily stored in the memory of the control part 2.

After that, the size obtaining part 3 uses the fixed values stored in the memory of the control part 2 to derive an epipolar line corresponding to the selected feature point of the first subject image. Next, the size obtaining part 3 identifies the search area of the second image in which the first imaging area corresponding to the first image can be overlapped with the second imaging area corresponding to the second image based on the characteristics and the arrangements of the first imaging system IS1 and the second imaging system IS2.

After the epipolar line in the second image is derived and the search area of the second image is identified, the size obtaining part 3 searches the pixels on the derived epipolar line only in the search area of the second image. With this process, the size obtaining part 3 detects the feature point of the second subject image in the second image corresponding to the selected feature point of the first subject image.

Specifically, the size obtaining part 3 performs convolution calculation (convolution integration) between the search block for the selected feature point of the first subject image stored in the memory of the control part 2 and each of epipolar line peripheral areas having the same size as that of the search block and whose centers are respectively positioned at the pixels on the epipolar line in the search area of the second image to calculate correlation values between the search block and each of the epipolar line peripheral areas. This calculation of the correlation values is performed along the derived epipolar line in the second image. The size obtaining part 3 detects a center pixel of the epipolar line peripheral area (i.e., the pixel on the epipolar line) having a highest correlation value as the feature point of the second subject image in the second image corresponding to the selected feature point of the first subject image. The coordinate ($x_2$, $y_2$) of the detected feature point of the second subject image is temporarily stored in the memory of the control part 2.

When the convolution calculation between the search block and each of the epipolar line peripheral areas is performed, an interpolation of pixels with respect to the search block or the second image may be performed. Any technique known in the art may be used in the corresponding feature point detection process to accurately obtain the correlation values between the search block and each of the epipolar line peripheral areas.

This process is repeatedly performed with changing the selected feature point of the first subject image until all of the feature points of the second subject image in the second image respectively corresponding to the detected feature points of the first subject image are detected. Thus, the size obtaining part 3 derives a plurality of epipolar lines respectively corresponding to the plurality of detected feature points of the first subject image and searches pixels on each of the epipolar lines in the search area of the second image as described above to detect the plurality of feature points of the second subject image in the second image respectively corresponding to the plurality of detected feature points of the first subject image. When all of the feature points of the second subject image in the second image respectively corresponding to the detected feature points of the first subject image are detected, the corresponding feature point detection process by the size obtaining part 3 ends.

After the corresponding feature point detection process is completed, the size obtaining part 3 measures the distance between the plurality of detected feature points of the second subject image from the coordinates ($x_2$, $y_2$) of the plurality of feature points of the second subject image temporarily stored in the memory of the control part 2 to obtain the size of the second subject image.

A ratio between the size of the first subject image and the size of the second subject image obtained by the size obtaining part 3 corresponds to the image magnification ratio "MR" ("$m_2$"/"$m_1$") between the magnification "$m_1$" of the first subject image and the magnification "$m_2$" of the second subject image. Therefore, the ratio between the size of the first subject image and the size of the second subject image obtained by the size obtaining part 3 is used as the image magnification ratio "MR" for calculating the distance to the subject 100.

The association information storage part 4 is an arbitrary non-volatility storage medium (such as a hard disk and a flash memory) for storing the association information for associating the image magnification ratio "MR" between the magnification "$m_1$" of the first subject image and the magnification "$m_2$" of the second subject image with the distance (the subject distance) from the front principal point of the first optical system OS1 to the subject 100. The association information stored in the association information storage part 4 is information for calculating the distance to the subject 100 from the image magnification ratio "MR" between the magnification "$m_1$" of the first subject image and the magnification "$m_2$" of the second subject image.

Typically, the association information stored in the association information storage part 4 is the following equation (1) for calculating the distance to the subject 100 based on the image magnification ratio "MR".

[Equation 1]1

$$a = \frac{K \cdot (f_1^2 - EP_1 \cdot f_1) - MR \cdot (f_2^2 - EP_2 \cdot f_2 + EP_2 \cdot D)}{MR \cdot EP_2 - K \cdot EP_1} \tag{1}$$

Here, "a" is the distance from the subject 100 to the front principal point of the first optical system OS1 of the first imaging system IS1, "$f_1$" is the focal length of the first optical system OS1, "$f_2$" is the focal length of the second optical system OS2, "$EP_1$" is the distance from the exit pupil of the first optical system OS1 to the image formation position of the first subject image when the subject 100 is located at the infinite distance point, "$EP_2$" is the distance from the exit pupil of the second optical system OS2 to the image formation position of the second subject image when the subject 100 is located at the infinite distance point and "D" is the depth disparity between the front principal point of the first optical system OS1 and the front principal point of the second optical system OS2.

Further, "K" in the above equation (1) is a coefficient represented by the following equation (2) and is a fixed value determined by the configurations and the arrangements of the first imaging system IS1 and the second imaging system IS2.

[Equation 2]2

$$K = \frac{f_2}{f_1} \cdot \frac{a_{FD1} - f_1}{a_{FD2} - f_2} \cdot \frac{f_2^2 - EP_2 \cdot f_2 + EP_2 - a_{FD2}}{f_1^2 - EP_1 \cdot f_1 + EP_1 - a_{FD1}} \tag{2}$$

Here, "$a_{FD1}$" is the distance from the front principal point of the first optical system OS1 to the subject 100 when the first subject image is in the best focus on the imaging surface of the first image sensor S1 and "$a_{FD2}$" is the distance from the front principal point of the second optical system OS2 to the subject 100 when the second subject image is in the best focus on the imaging surface of the second image sensor S2.

Since "$f_1$", "$f_2$", "$EP_1$", "$EP_2$", "D" and "K" in the above equation (1) are the fixed values determined by the configurations and the arrangements of the first imaging system IS1 and the second imaging system IS2, it is possible to calculate the distance from the subject 100 to the front principal point of the first optical system OS1 based on the image magnification ratio "MR" between the magnification "$m_1$" of the first subject image and the magnification "$m_2$" of the second subject image obtained which can be obtained from the ratio between the size of the first subject image and the size of the second subject image obtained by the size obtaining part 3.

Since the theory and steps for deriving the above equation (1) for calculating the distance to the subject 100 based on the image magnification ratio "MR" have been described in detail in the above patent document 2 (JP 2017-241896)

which has already been filed by the present inventor and the others, description for deriving the above equation (1) is omitted from the specification.

Alternatively, the association information stored in the association information storage part 4 may be a look-up table for uniquely associating the image magnification ratio "MR" with the distance to the subject 100. By referring to such association information stored in the association information storage part 4, it becomes possible to calculate the distance to the subject 100 based on the image magnification ratio "MR". In the case where the association information stored in the association information storage part 4 is the above-described equation for calculating the distance to the subject 100, the parameters stored in the memory of the control part 2 are also referred in addition to the association information to calculate the distance to the subject 100.

The distance calculating part 5 has a function of calculating the distance to the subject 100 based on the image magnification ratio "MR" between the magnification "$m_1$" of the first subject image and the magnification "$m_2$" of the second subject which is obtained as the ratio between the size of the first subject image and the size of the second subject image obtained by the size obtaining part 3. Specifically, the distance calculating part 5 calculates the ratio between the size of the first subject image and the size of the second subject image obtained by the size obtaining part 3 as the image magnification ratio "MR" between the magnification "$m_1$" of the first subject image and the magnification "$m_2$" of the second subject. After that, the distance calculating part 5 refers to the association information stored in the association information storage part 4 (and the parameters stored in the memory of the control part 2 if the association information is the above-described equation for calculating the distance to the subject 100) to calculate (identify) the distance to the subject 100 based on the image magnification ratio "MR".

The three-dimensional image creating part 6 has a function of creating a three-dimensional image of the subject 100 based on the distance to the subject 100 calculated by the distance calculating part 5 and the color or monochrome luminance information of the subject 100 (that is the first image or the second image) obtained by the first image sensor S1 or the second image sensor S2. The words of "the three-dimensional image of the subject 100" used in the specification means data in which the calculated distance to the subject 100 is associated with pixels of the two-dimensional image representing the color or monochrome luminance information of the subject 100. In this regard, if each of the first image sensor S1 and the second image sensor S2 is the phase sensor for obtaining the phase information of the subject 100, the three-dimensional image creating part 6 may be omitted.

The display part 7 is panel type display means such as a liquid crystal display. The display part 7 displays various information containing the color or monochrome luminance information or the phase information of the subject 100 (the first image or the second image) obtained by the first image sensor S1 or the second image sensor S2, the distance to the subject 100 calculated by the distance calculating part 5, the three-dimensional image of the subject 100 created by the three-dimensional image creating part 6 and information required for operating the distance measuring camera 1 in the form of characters or images in accordance with the control from the processor of the control part 2.

The operation part 8 is used for performing operations by the user of the distance measuring camera 1. The operation part 8 is not particularly limited to a specific kind as long as the user of the distance measuring camera 1 can use the operation part 8 to perform the operations. For example, it is possible to employ a mouse, a keyboard, a numeric keypad, a button, a dial, a lever, a touch panel or the like as the operation part 8. The operation part 8 transmits signals respectively corresponding to the operations from the user of the distance measuring camera 1 to the processor of the control part 2.

The communication part 9 has a function of inputting data into the distance measuring camera 1 and/or outputting data from the distance measuring camera 1 to external devices. The communication part 9 may be configured to be connected to a network such as the Internet. In this case, the distance measuring camera 1 can use the communication part 9 to perform communication with the external devices such as a web server and a data server provided outside the distance measuring camera 1.

As described above, in the distance measuring camera 1 of the present invention, the first optical system OS1 and the second optical system OS2 are configured and arranged so that the change of the magnification "$m_1$" of the first subject image with respect to the distance to the subject 100 is different from the change of the magnification "$m_2$" of the second subject image according to the distance to the subject 100. Thus, the distance measuring camera 1 of the present invention can uniquely calculate the distance to the subject 100 based on the image magnification ratio "MR" ("$m_2$"/"$m_1$") between the magnification "$m_1$" of the first subject image and the magnification "$m_2$" of the second subject image.

Further, the distance measuring camera 1 of the present invention uses the epipolar line based on the epipolar geometry in the corresponding feature point detection process performed by the size obtaining part 3. Therefore, it is possible to largely reduce the processing time for the corresponding feature point detection process and thus it is possible to largely reduce the processing time for calculating the distance to the subject 100.

Furthermore, in the corresponding feature point detection process performed by the size obtaining part 3 of the distance measuring camera 1 of the present invention, the area of the second image in which the search for the pixels on the epipolar line is performed is limited to the search area of the second image in which the first imaging area corresponding to the first image can be overlapped with the second imaging area corresponding to the second image. Therefore, since the area of the second image to be searched in the distance measuring camera 1 of the present invention is limited as compared with the case where the search for the pixels on the epipolar line is performed in the entire area of the second image, it is possible to reduce the processing time for the corresponding feature point detection process. As a result, it is possible to further reduce the processing time for calculating the distance to the subject 100 based on the image magnification ratio "MR" of the magnification "$m_1$" of the first subject image and the magnification "$m_2$" of the second subject image.

Distance Measuring Method

Next, a distance measuring method performed by the above-described distance measuring camera 1 will be described with reference to FIGS. 7 and 8. FIG. 7 is a flowchart for explaining the distance measuring method performed by the distance measuring camera according to the first embodiment of the present invention. FIG. 8 is a flowchart for explaining details of the corresponding feature point detection process performed in the distance measuring method shown in FIG. 7.

The distance measuring method described in detail below can be performed by using the above-described distance measuring camera 1 and an arbitrary device having the same function as that of the distance measuring camera 1. For the sake of explanation, it is assumed that the distance measuring method is performed by using the distance measuring camera 1 according to the first embodiment of the present invention.

A distance measuring method S100 shown in FIG. 7 starts when the user of the distance measuring camera 1 uses the operation part 8 to perform an operation for measuring the distance to the subject 100. At a step S110, the first image sensor S1 of the first imaging system IS1 images the first subject image formed by the first optical system OS1 to obtain the first image (first image data) containing the first subject image. The first image is transmitted to the control part 2 and the size obtaining part 3 through the data bus 10. Similarly, at a step S120, the second image sensor S2 of the second imaging system IS2 images the second subject image formed by the second optical system OS2 to obtain the second image (second image data) containing the second subject image. The second image is transmitted to the control part 2 and the size obtaining part 3 through the data bus 10. In this regard, the obtaining of the first image at the step S110 may be performed simultaneously with or separately from the obtaining of the second image at the step S120.

After the first image and the second image are obtained at the steps S110 and S120, the distance measuring method S100 proceeds to a step S130. At the step S130, the size obtaining part 3 detects a plurality of arbitrary feature points of the first subject image in the first image. For example, examples of the plurality of arbitrary feature points of the first subject image detected by the size obtaining part 3 at the step S130 contain both edge portions in the height direction of the first subject image or both edge portions in the width direction of the first subject image. The coordinate $(x_1, y_1)$ of each of the feature points of the first subject image detected by the size obtaining part 3 is temporarily stored in the memory of the control part 2.

At a step S140, the size obtaining part 3 refers to the coordinate $(x_1, y_1)$ of each of the feature points of the first subject image temporarily stored in the memory of the control part 2 and measures a distance between the plurality of detected feature points of the first subject image to obtain the size of the first subject image. The size of the first subject image obtained at the step S140 is temporarily stored in the memory of the control part 2.

After that, at a step S150, the size obtaining part 3 performs the corresponding feature point detection process for detecting a plurality of feature points of the second subject image in the second image respectively corresponding to the plurality of feature points of the first subject image detected at the step S130. FIG. 8 shows the flow chart illustrating the details of the corresponding feature point detection process performed at the step S150.

At a step S151, the size obtaining part 3 refers to the coordinate $(x_1, y_1)$ of each of the feature points of the first subject image stored in the memory of the control part 2 and selects any one of the detected feature points of the first subject image. Next, at a step S152, the size obtaining part 3 cuts out an area having a predetermined size and whose center is positioned at the selected feature point of the first subject image in the first image (for example, 5×5 pixel area, 7×7 pixel area or the like whose center is positioned at the selected feature point) to obtain a search block for the selected feature point. The obtained search block is temporarily stored in the memory of the control part 2.

Next, at a step S153, the size obtaining part 3 uses the parameters stored in the memory of the control part 2 to derive an epipolar line in the second image corresponding to the feature point of the first subject image selected at the step S151. The derivation of the epipolar line in the second image at the step S153 can be performed with various methods known in the field of the epipolar geometry.

After that, at a step S154, the size obtaining part 3 identifies a search area of the second image in which the first imaging area corresponding to the first image can be overlapped with the second imaging area corresponding to the second image based on the characteristics and the arrangements of the first imaging system IS1 and the second imaging system IS2. Specifically, the size obtaining part 3 identifies the search area of the second image from the angle of view of the first imaging system IS1, the angle of view of the second imaging system IS2, the parallel disparity $(P_x, P_y)$ and the depth disparity "D" between the first imaging system IS1 and the second imaging system IS2 stored in the memory of the control part 2.

After that, at a step S155, the size obtaining part 3 performs the convolution calculation (the convolution integration) between the search block for the selected feature point of the first subject image stored in the memory of the control part 2 and each of epipolar line peripheral areas having the same size as that of the search block and whose centers are respectively positioned at pixels on the derived epipolar line only in the identified search area of the second image to calculate correlation values between the search block and each of the epipolar line peripheral areas. The calculated correlation values are temporarily stored in the memory of the control part 2. This calculation of the correlation values is also referred to as "a block matching" and is performed along the derived epipolar line in the search area of the second image.

When the calculation of the correlation values along the epipolar line in the search area of the second image is completed, the process of the step S150 proceeds to a step S156. At the step S156, the size obtaining part 3 detects a center pixel of the epipolar line peripheral area (i.e., a pixel on the epipolar line) having a highest correlation value in the search area of the second image as the feature point of the second subject image in the second image corresponding to the selected feature point of the first subject image. The coordinate $(x_2, y_2)$ of the detected feature point of the second subject image is temporarily stored in the memory of the control part 2.

After that, at a step S157, it is determined whether or not all of the feature points of the first subject image detected at the step S130 have been selected at the step S151. When all of the feature points of the first subject image detected at the step S130 have not been selected at the step S151 (the step S157="No"), the process of the step S150 returns to the step S151. At the step S151, an unselected one of the feature points of the first subject image is newly selected and thus the selected feature point of the first subject image is updated. The processes of the steps S151 to S157 are repeatedly performed with changing the selected feature point of the first subject image until all of the feature points of the second subject image in the second image respectively corresponding to the detected feature points of the first subject image are detected.

When all of the feature points of the first subject image detected at the step S130 have been selected at the step S151 (the step S157="Yes"), the process of step S150 ends. When the process of the process S150 ends, the distance measuring method S100 proceeds to a step S160.

Referring back to FIG. 7, at the step S160, the size obtaining part 3 measures a distance between the plurality of detected feature points of the second subject image to obtain the size of the second subject image. The size of the second subject image obtained at the step S160 is temporarily stored in the memory of the control part 2.

When the size of the first subject image and the size of the second subject image are obtained by the size obtaining part 3, the distance measuring method S100 proceeds to a step S170. At the step S170, the distance calculating part 5 calculates the image magnification ratio "MR" between the magnification "$m_1$" of the first subject image and the magnification "$m_2$" of the second subject image from the ratio between the size of the first subject image and the size of the second subject image temporarily stored in the memory of the control part 2. Next, at a step S180, the distance calculating part 5 refers to the association information stored in the association information storage part 4 to calculate the distance to the subject 100 based on the calculated image magnification ratio "MR". If the association information is the above-described equation (1) for calculating the distance to the subject 100, the distance calculating part 5 calculates the distance to the subject 100 by referring to the parameters stored in the memory of the control part 2 in addition to the association information.

When the distance calculating part 5 calculates the distance to the subject 100 at the step S180, the distance measuring method S100 proceeds to a step S190. At the step S190, the three-dimensional image creating part 6 creates the three-dimensional image of the subject 100 based on the distance to the subject 100 calculated by the distance calculating part 5 and the color or monochrome luminance information of the subject 100 (the first image or the second image) obtained by the first image sensor S1 or the second image sensor S2. In the case where each of the first image sensor S1 and the second image sensor S2 is the phase sensor for obtaining the phase information of the subject 100, the step S190 is omitted.

After that, the color or monochrome luminance information or the phase information of the subject 100, the distance to the subject 100 and/or the three-dimensional image of the subject 100 obtained in the preceding steps are displayed on the display part 7 or transmitted to the external devices by the communication part 9 and then the distance measuring method S100 ends.

Second Embodiment

Next, description will be given to a distance measuring camera according to a second embodiment of the present invention with reference to FIGS. 9 to 14. FIG. 9 is a diagram for explaining an example of arrangements of a first imaging system and a second imaging system of the distance measuring camera according to the second embodiment of the present invention and the changes of the positions of the feature points in the second image respectively corresponding to the feature points in the first image according to the distance to the subject. FIG. 10 is a diagram for explaining an area in which a left area of the first imaging area corresponding to the first image can be overlapped with the second imaging area corresponding to the second image in the example of the arrangements of the first imaging system and the second imaging system shown in FIG. 9. FIG. 11 is another diagram for explaining the changes of the positions of the feature points in the second image respectively corresponding to the feature points in the first image according to the distance to the subject in the example of the arrangements of the first imaging system and the second imaging system shown in FIG. 9. FIG. 12 is a diagram for explaining an area in which a right area of the first imaging area corresponding to the first image can be overlapped with the second imaging area corresponding to the second image in the example of the arrangements of the first imaging system and the second imaging system shown in FIG. 9. FIG. 13 is a diagram for explaining an area in which the left area of the first imaging area corresponding to the first image can be overlapped with the second imaging area corresponding to the second image in another example of the arrangements of the first imaging system and the second imaging system. FIG. 14 is a diagram for explaining an area in which the right area of the first imaging area corresponding to the first image can be overlapped with the second imaging area corresponding to the second image in the other example of the arrangements of the first imaging system and the second imaging system.

Hereinafter, the distance measuring camera 1 of the second embodiment will be described by placing emphasis on the points differing from the distance measuring camera 1 of the first embodiment with the same matters being omitted from the description. The distance measuring camera 1 of the present embodiment has the same configuration as the configuration of the distance measuring camera 1 of the first embodiment except that the size obtaining part 3 is configured to identify the position of each of the feature points of the first subject image in the first image and limit the search area of the second image in the corresponding feature point detection process.

In the present embodiment, the size obtaining part 3 is configured to identify the position of each of the feature points of the first subject image in the first image and limit the search area of the second image based on the position of each of the feature points of the first subject image in the first image when detecting the plurality of feature points of the second subject image in the second image respectively corresponding to the plurality of feature points of the first subject image.

Hereinafter, description will be given to the limitation for the search area of the second image in the present embodiment. In an example of the arrangements of the first imaging system IS1 and the second imaging system IS2 shown in the upper side of FIG. 9, the parallel disparity "$P_x$" from the first imaging system IS1 to the second imaging system IS2 in the x-axis direction in the drawing is positive ("$P_x$">0). In other words, in the example shown in FIG. 9, the second imaging system IS2 is located on the right side of the first imaging system IS1.

Referring to FIGS. 9 and 10, discussion will be given to a case where a feature point in the first image exists in a left area of the first image. In this case described with reference to FIGS. 9 and 10, the first image is bordered by a center in the x-axis direction and divided into the left area and a right area with the center in the x-axis as a boundary.

Similar to the first embodiment described with reference to FIG. 3, a feature point in the second image corresponding to the feature point existing at the left-side edge of the first image is shifted from a position shown in the section (a) of FIG. 9 to a position shown in the section (c) of FIG. 9 in the x-axis direction according to the distance from the first imaging system IS1 to the subject 100 as shown in the sections (a) to (c) of FIG. 9.

Regarding a feature point existing at the center of the first image in the x-axis direction, when the subject 100 is located so as to be spaced apart from the first imaging system IS1 by a distance which is equal to the measurement start distance ("the subject distance"="the measurement start distance"), a feature point in the second image (a square point of the section (d) of FIG. 9) corresponding a feature point existing at the center of the first image in the x-axis direction exists at a position shifted from a left-side edge of the second image toward the right side as shown in the section (d) of FIG. 9.

When the subject 100 is located so as to be spaced apart from the first imaging system IS1 by an arbitrary distance which is larger than the measurement start distance ("the subject distance" "the arbitrary distance"), the feature point in the second image (the square point in the section (e) of FIG. 9) corresponding to the feature point existing at the center of the first image in the x-axis direction exists at a position further shifted from the position shown in the section (d) of FIG. 9 toward the right side as shown in the section (e) of FIG. 9.

Further, when the subject 100 is located at the infinite distance point ("the subject distance"="the infinite distance"), the feature point in the second image (the square point in the section (f) of FIG. 9) corresponding to the feature point existing at the center of the first image in the x-axis direction exists at a position further shifted to from the position shown in the section (e) of FIG. 9 toward the right side as shown in the section (f) of FIG. 9.

As described above, the feature point in the second image corresponding to the feature point existing at the center of the first image in the x-axis direction is shifted from the position shown in the section (d) of FIG. 9 to the position shown in the section (f) of FIG. 9 in the x-axis direction according to the distance from the first imaging system IS1 to the subject 100.

Regarding the x-axis direction, when an arbitrary feature point in the first image exists in the left area of the first image, the arbitrary feature point in the first image exists at a certain position between the left-side edge and the center of the first image in the x-axis direction. Thus, an x-axis position of a feature point in the second image corresponding to the arbitrary feature point existing in the left area of the first image is limited within an area between the position shown in the section (a) of FIG. 9 and the position shown in the section (f) of FIG. 9.

Therefore, when the arbitrary feature point in the first image exists in the left area of the first image, an area in which the feature point in the second image corresponding to the arbitrary feature point in the left area of the first image can be located, that is, an area in which the left area of the first imaging area corresponding to the first image can be overlapped with the second imaging area corresponding to the second image is not the entire area of the second image but a limited area of the second image.

FIG. 10 shows the area in which the left area of the first imaging area corresponding to the first image can be overlapped with the second imaging area corresponding to the second image in the example of the arrangements of the first imaging system and the second imaging system shown in FIG. 9.

Regarding the x-axis direction, the area in which the left area of the first imaging area corresponding to the first image can be overlapped with the second imaging area corresponding to the second image is equivalent to an area between the position of the feature point in the second image corresponding to the feature point existing at the left-side edge of the first image when the distance to the subject 100 is equal to the measurement start distance (this position is shown in the section (a) of FIG. 9) and the position of the feature point in the second image corresponding to the feature point existing at the center of the first image in the x-axis direction when the distance to the subject 100 is equal to the infinite distance (this position is shown in the section (f) of FIG. 9).

When the distance from the first imaging system IS1 to the subject 100 falls within the range between the measurement start distance to the infinite distance, the feature point in the left area of the first image always exists in the area in which the left area of the first imaging area corresponding to the first image can be overlapped with the second imaging area corresponding to the second image as shown in FIG. 10.

Next, referring to FIGS. 11 and 12, discussion will be given to a case where a feature point in the first image exists in the right area of the first image. Similar to the first embodiment described with reference to FIG. 3, a feature point in the second image corresponding to the feature point existing at the right-side edge of the first image is shifted from a position shown in the section (a) of FIG. 11 to a position shown in the section (c) of FIG. 11 in the x-axis direction according to the distance from the first imaging system IS1 to the subject 100 as shown in the sections (a) to (c) of FIG. 11.

Regarding a feature point existing at the center of the first image in the x-axis direction, when the subject 100 is located so as to be spaced apart from the first imaging system IS1 by a distance which is equal to the measurement start distance ("the subject distance"="the measurement start distance"), a feature point in the second image (a square point of the section (d) of FIG. 11) corresponding the feature point existing at the center of the first image in the x-axis direction exists at a position shifted from a left-side edge of the second image toward the right side as shown in the section (d) of FIG. 11.

When the subject 100 is located so as to be spaced apart from the first imaging system IS1 by an arbitrary distance which is larger than the measurement start distance ("the subject distance" "the arbitrary distance"), the feature point in the second image (the square point in the section (e) of FIG. 11) corresponding to the feature point existing at the center of the first image in the x-axis direction exists at a position further shifted from the position shown in the section (d) of FIG. 11 toward the right side as shown in the section (e) of FIG. 11.

Further, when the subject 100 is located at the infinite distance point ("the subject distance"="the infinite distance"), the feature point in the second image (the square point in the section (f) of FIG. 11) corresponding to the feature point existing at the center of the first image in the x-axis direction exists at a position further shifted from the position shown in the section (e) of FIG. 11 toward the right side as shown in the section (f) of FIG. 11.

As described above, the feature point in the second image corresponding to the feature point existing at the center of the first image in the x-axis direction is shifted from the position shown in the section (d) of FIG. 11 to the position shown in the section (f) of FIG. 11 in the x-axis direction according to the distance from the first imaging system IS1 to the subject 100.

Regarding the x-axis direction, when an arbitrary feature point in the first image exists in the right area of the first image, the arbitrary feature point in the first image exists at a certain position between the right-side edge and the center of the first image in the x-axis direction. Thus, an x-axis position of a feature point in the second image corresponding to the arbitrary feature point existing in the right area of the first image is limited within an area between the position shown in the section (c) of FIG. 11 and the position shown in the section (d) of FIG. 11.

FIG. 12 shows the area in which the right area of the first imaging area corresponding to the first image can be overlapped with the second imaging area corresponding to the second image in the example of the arrangements of the first imaging system and the second imaging system shown in FIG. 11.

Regarding the x-axis direction, the area in which the right area of the first imaging area corresponding to the first image can be overlapped with the second imaging area corresponding to the second image is equivalent to an area between the position of the feature point in the second image corresponding to the feature point existing at the center of the first image in the x-axis direction when the distance to the subject 100 is equal to the measurement start distance (this position is shown in the section (d) of FIG. 11) and the position of the feature point in the second image corresponding to the feature point existing at the right-side edge of the first image when the distance to the subject 100 is equal to the infinite distance (this position is shown in the section (c) of FIG. 11).

When the distance from the first imaging system IS1 to the subject 100 falls within the range between the measurement start distance and the infinite distance, the feature point in the right area of the first image always exists in the area in which the right area of the first imaging area corresponding to the first image can be overlapped with the second imaging area corresponding to the second image as shown in FIG. 12.

This concept can be also applied to a case where the second imaging system IS2 is located on the left side of the first imaging system IS1 as shown in FIG. 5 ("$P_x$"<0). FIG. 13 shows the area in which the left area of the first imaging area corresponding to the first image can be overlapped with the second imaging area corresponding to the second image in the case where the second imaging system IS2 is located on the left side of the first imaging system IS1. FIG. 14 shows the area in which the right area of the first imaging area corresponding to the first image can be overlapped with the second imaging area corresponding to the second image in the case where the second imaging system IS2 is located on the left side of the first imaging system IS1.

As is clear from FIGS. 13 and 14, in the case where the second imaging system IS2 is located on the left side of the first imaging system IS1 ("$P_x$"<0), the area shown in FIG. 13 in which the left area of the first imaging area corresponding to the first image can be overlapped with the second imaging area corresponding to the second image is different from the area shown in FIG. 14 in which the right area of the first imaging area corresponding to the first image can be overlapped with the second imaging area corresponding to the second image.

The size obtaining part 3 can utilize the above described principle to limit the search area of the second image based on the arrangements of the first imaging system IS1 and the second imaging system IS2 (i.e., the information as to whether the second imaging system IS2 is located on the right side or the left side of the first imaging system IS1) and the information as to whether the detected feature point of the first subject image exists in the left area or the right area of the first image.

In the present embodiment, the size obtaining part 3 is configured to identify whether each of the detected feature points of the first subject image exists in the left area or the right area of the first image when detecting the plurality of feature points of the first subject image contained in the first image at the step S130 of the distance measuring method S100 described above. Further, the size obtaining part 3 is configured to limit the search area of the second image based on the arrangements of the first imaging system IS1 and the second imaging system IS2 (i.e., the information as to whether the second imaging system IS2 is located on the right side or the left side of the first imaging system IS1) and the information as to whether the detected feature point of the first subject image is located in the left area or the right area of the first image according to the principle described with reference to FIGS. 9 to 14 when identifying the search area of the second image at the step S154 of the distance measuring method S100.

Therefore, since the search area of the second image to be searched in the corresponding feature point detection process is limited in the distance measuring camera 1 of the present invention as compared with the distance measuring camera 1 of the first embodiment, it is possible to further reduce the processing time for the corresponding feature point detection process. As a result, it is possible to further reduce the processing time for calculating the distances to the subject 100 based on the image magnification ratio "MR" of the magnification "$m_1$" of the first subject image and the magnification "$m_2$" of the second subject image.

Although the distance measuring camera of the present invention has been described based on the embodiments shown in the accompanying drawings, the present invention is not limited thereto. The configurations of the respective components of the present invention may be possibly replaced with other arbitrary configurations having equivalent functions. Further, it may be also possible to add other arbitrary components to the configuration of the present invention.

A person having skill in the art and the field to which the present invention belongs would be able to carry out modifications of the described configuration of the distance measuring camera of the present invention without meaningfully departing from the principles, ideas and scope of the present invention. Further, distance measuring cameras having modified configurations are also involved within the scope of the present invention.

Further, the number and types of components of the distance measuring camera shown in FIG. 1 are merely illustrative examples and the present invention is not necessarily limited thereto. Aspects in which any component is added or combined or any component is deleted without departing from the principles and intent of the present invention are also involved within the scope of the present invention. Each component of the distance measuring camera may be realized by hardware, software or a combination thereof.

In addition, the number and kinds of steps of the distance measuring method S100 shown in FIGS. 7 and 8 are merely illustrative examples and the present invention is not necessarily limited thereto. Aspects in which any step is added or combined or any step is deleted without departing from the principles and intent of the present invention are also involved within the scope of the present invention.

Furthermore, in the second embodiment described with reference to FIGS. 4 to 14, although the size obtaining part 3 identifies whether each of the feature points of the first subject image in the first image is located in the left area of the first image or the right area of the first image and limits the search area of the second image based on whether each of the feature points of the first subject image is located in the left area of the first image or the right area of the first image when detecting the plurality of feature points of the second subject image respectively corresponding to the plurality of feature points of the first subject image, the limitation for the search area of the second image performed by the size obtaining part 3 based on the position of the feature point of the first subject image in the first image is not limited thereto.

For example, the first image may be divided into three areas along the x-axis direction, i.e., a left area, a central area and a right area. Further, the size obtaining part 3 may be configured to identify whether each of the feature points of first subject image in the first image exists in which one of the left area, the central area and the right area of the first image and limit the search area of the second image based on this identification result.

A method of dividing the first image into some areas in the corresponding feature point detection process performed by the size obtaining part 3 (such as a method of dividing the first image into the left area and the right area as described in the second embodiment) can be arbitrarily set. A person having skill in the art would be able to appropriately set how to divide the first image into some areas in the corresponding feature point detection process depending on the number of the pixels of each of the first image and the second image and the characteristics and the arrangements of the first imaging system IS1 and the second imaging system IS2. Such aspects are also involved within the scope of the present invention.

INDUSTRIAL APPLICABILITY

The distance measuring camera of the present invention utilizes the epipolar line based on the epipolar geometry for the search of the feature points in the corresponding feature point detection process for detecting the plurality of feature points of one of the subject images respectively corresponding to the plurality of feature points of the other one of the subject images. Therefore, it is possible to reduce the processing time for calculating the distance to the subject based on the image magnification ratio between the subject images. Further, the distance measuring camera of the present invention performs the search for the pixels on the epipolar line only in the search area of the second image in which the first imaging area corresponding to the first image can be overlapped with the second imaging area corresponding to the second image in the corresponding feature point detection process. Therefore, in the distance measuring camera of the present invention, the search area of the second image is limited as compared with the case where the search for the pixels on the epipolar line is performed in the entire area of the second image. With this process, it is possible to further reduce the processing time for calculating the distance to the subject based on the image magnification ratio between the subject images. For the reasons stated above, the present invention has industrial applicability.

The invention claimed is:

1. A distance measuring camera, comprising:
a first imaging system including a first optical system for collecting light from a subject to form a first subject image and a first image sensor for imaging the first subject image to obtain a first image containing the first subject image;
a second imaging system including a second optical system for collecting the light from the subject to form a second subject image and arranged so as to be shifted from the first optical system in a direction perpendicular to an optical axis direction of the first optical system and a second image sensor for imaging the second subject image to obtain a second image containing the second subject image; and
a processor configured to:
detect a plurality of feature points of the first subject image in the first image and measure a distance between the plurality of feature points of the first subject image to obtain a size of the first subject image,
detect a plurality of feature points of the second subject image in the second image respectively corresponding to the plurality of feature points of the first subject image and measure a distance between the plurality of feature points of the second subject image to obtain a size of the second subject image, and
calculate a distance to the subject based on an image magnification ratio between a magnification of the first subject image and a magnification of the second subject image,
wherein the image magnification ratio is obtained as a ratio between the size of the first subject image and the size of the second subject image obtained by the processor, and
wherein the processor is configured to search pixels on a plurality of epipolar lines respectively corresponding to the plurality of feature points of the first subject image only in a search area of the second image in which a first imaging area corresponding to the first image can be overlapped with a second imaging area corresponding to the second image to detect the plurality of feature points of the second subject image in the second image, and
wherein the first imaging system and the second imaging system are configured so that an entire area of the first imaging area corresponding to the first image is contained within the second imaging area corresponding to the second image when the subject located at a distance which is equal to or larger than a measurement start distance determined by a parallel disparity and a depth disparity between the first imaging system and the second imaging system and characteristics of the first imaging system and the second imaging system is imaged.

2. The distance measuring camera as claimed in claim 1, wherein a focal length of the first optical system is longer than a focal length of the second optical system.

3. The distance measuring camera as claimed in claim 1, wherein the processor is configured to identify the search area of the second image in which the first imaging area corresponding to the first image can be overlapped with the second imaging area corresponding to the second image based on the parallel disparity and the depth disparity between the first imaging system and the second imaging system and the characteristics of the first imaging system and the second imaging system.

4. The distance measuring camera as claimed in claim 1, wherein the processor is configured to identify a position of each of the plurality of feature points of the first subject image in the first image and limit the search area of the second image based on the position of each of the plurality of feature points of the first subject image in the first image at a time of detecting the plurality of feature points of the second subject image in the second image respectively corresponding to the plurality of feature points of the first subject image.

5. The distance measuring camera as claimed in claim 4, wherein the processor is configured to identify whether each of the plurality of feature points of the first subject image is located in a left area from a center of the first image or in a right area from the center of the first image and limit the search area of the second image based on whether each of the plurality of feature points of the first subject image is located in the left area of the first image or in the right area of the first image at the time of detecting the plurality of feature points of the second subject image in the second image respectively corresponding to the plurality of feature points of the first subject image.

6. A distance measuring camera, comprising:

a first imaging system including a first optical system for collecting light from a subject to form a first subject image and a first image sensor for imaging the first subject image to obtain a first image containing the first subject image;

a second imaging system including a second optical system for collecting the light from the subject to form a second subject image and arranged so as to be shifted from the first optical system in a direction perpendicular to an optical axis direction of the first optical system and a second image sensor for imaging the second subject image to obtain a second image containing the second subject image; and a processor configured to:

detect a plurality of feature points of the first subject image in the first image and measure a distance between the plurality of feature points of the first subject image to obtain a size of the first subject image, detect a plurality of feature points of the second subject image in the second image respectively corresponding to the plurality of feature points of the first subject image and measure a distance between the plurality of feature points of the second subject image to obtain a size of the second subject image, and calculate a distance to the subject based on an image magnification ratio between a magnification of the first subject image and a magnification of the second subject image, wherein the image magnification ratio is obtained as a ratio between the size of the first subject image and the size of the second subject image obtained by the processor, wherein the processor is configured to search pixels on a plurality of epipolar lines respectively corresponding to the plurality of feature points of the first subject image only in a search area of the second image in which a first imaging area corresponding to the first image can be overlapped with a second imaging area corresponding to the second image to detect the plurality of feature points of the second subject image in the second image, and wherein the processor is configured to identify a position of each of the plurality of feature points of the first subject image in the first image and limit the search area of the second image based on the position of each of the plurality of feature points of the first subject image in the first image at a time of detecting the plurality of feature points of the second subject image in the second image respectively corresponding to the plurality of feature points of the first subject image.

* * * * *